(12) United States Patent
Tada

(10) Patent No.: US 10,879,820 B2
(45) Date of Patent: Dec. 29, 2020

(54) CONTROL DEVICE FOR BRUSHLESS DC SERVO MOTOR

(71) Applicant: IGARASHI ELECTRIC WORKS LTD., Kawasaki (JP)

(72) Inventor: Junichi Tada, Kawasaki (JP)

(73) Assignee: IGARASHI ELECTRIC WORKS LTD., Kawasaki (JP)

(*) Notice: Subject to any disclaimer, the term of this patent is extended or adjusted under 35 U.S.C. 154(b) by 93 days.

(21) Appl. No.: 16/306,157

(22) PCT Filed: Jun. 12, 2017

(86) PCT No.: PCT/JP2017/021703
§ 371 (c)(1),
(2) Date: Nov. 30, 2018

(87) PCT Pub. No.: WO2018/229842
PCT Pub. Date: Dec. 20, 2018

(65) Prior Publication Data
US 2020/0228035 A1     Jul. 16, 2020

(51) Int. Cl.
*H02K 29/06*     (2006.01)
*H02P 6/17*     (2016.01)
(Continued)

(52) U.S. Cl.
CPC ............. *H02P 6/17* (2016.02); *H02K 11/215* (2016.01); *H02K 11/33* (2016.01); *H02K 11/35* (2016.01); *H02P 6/28* (2016.02)

(58) Field of Classification Search
CPC ..... H02P 6/16; H02P 6/28; H02P 7/06; G05B 5/01
See application file for complete search history.

(56) References Cited

U.S. PATENT DOCUMENTS

| 9,337,757 B2 | 5/2016 | Nakamura |
| 2010/0250184 A1 | 9/2010 | Kawamura et al. |
| 2016/0327410 A1* | 11/2016 | Kochan, Jr. ............... H02P 6/16 |

FOREIGN PATENT DOCUMENTS

| JP | 2000-295890 A | 10/2000 |
| JP | 5058334 B2 | 10/2012 |

(Continued)

OTHER PUBLICATIONS

International Search Report Corresponding to PCT/JP2017/021703 dated Sep. 12, 2017.

*Primary Examiner* — Karen Masih
(74) *Attorney, Agent, or Firm* — Davis & Bujold PLLC; Michael J. Bujold

(57) ABSTRACT

A control device for a brushless DC servo motor which uses a MR sensor unit and controls the motor with high precision by a closed loop. The motor control device comprises a control unit for controlling power supplied to three pairs of stator coils of U, V and W phases. The control unit generates phase information for each of the U, V and W phases and obtains an absolute origin position of the rotary shaft with respect to the driving signal, when the brushless DC servo motor is driven, based on the synchronization relationship of: a driving signal rising phase from zero; an integrated value peak phase of counter electromotive force to the phase stator coil obtained by driving the motor; and a rising phase of the output signal of the A phase or the B phase output from the MR sensor unit corresponding to zero of the driving signal.

10 Claims, 19 Drawing Sheets

(51) Int. Cl.
  *H02K 11/215*    (2016.01)
  *H02K 11/33*     (2016.01)
  *H02K 11/35*     (2016.01)
  *H02P 6/28*      (2016.01)

(56) References Cited

FOREIGN PATENT DOCUMENTS

| | | |
|---|---|---|
| JP | 5401875 B2 | 1/2014 |
| JP | 2015-049047 A | 3/2015 |
| JP | 2015-149800 A | 8/2015 |
| JP | 2017-034813 A | 2/2017 |
| JP | 2017-055608 A | 3/2017 |

\* cited by examiner

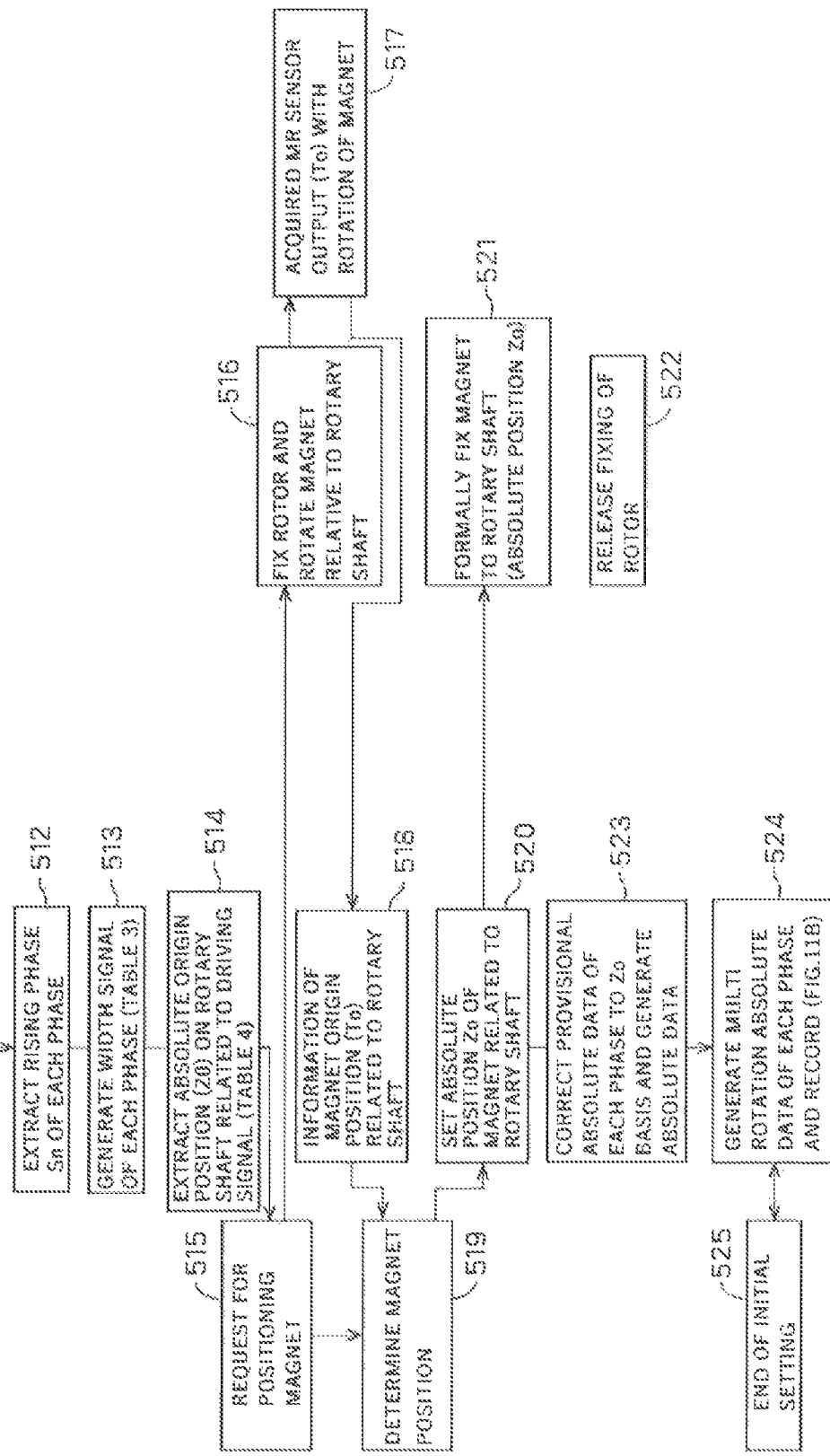

CONTROL DEVICE FOR BRUSHLESS DC SERVO MOTOR

FIELD OF THE INVENTION

The present invention relates to a control device for a brushless DC motor, and more particularly to a control device for a brushless DC servo motor suitable for servo control for operating the brushless DC servo motor for driving a driven component at a target speed and a target position.

Background of the Invention

Since a brushless DC motor can obtain a stable performance and excellent in durability, it is widely adopted in various fields as a drive source of equipment constituting various control systems, such as automotive accessories.

There are three main control methods of the brushless DC motor as follows.

(1) Synchronous control of the motor is performed by using three Hall elements of U, V, W, as a Hall sensor.

(2) Motor is controlled in an open loop by sensor-less, for example, vector control etc.

(3) By synchronizing signals of U phase, V phase and W phase obtained by a rotary encoder with a magnetic pole position of a rotor, a motor is controlled in a completely closed loop as a brushless DC servo motor.

In JP 2015-149800A, an invention is disclosed that three Hall elements and one GMR detector are used as a sensor unit, and based on those output signal values, information of any specified position and information of torque strange movement of a three-phase permanent magnet motor are acquired.

In JP 2017-034813A, an invention which controls a motor by sensor-less is described. Namely, in a stationary state of a rotor, an inspection power smaller than the power that the rotor can continuously rotate is applied to coils of each energized phase in each drive state for a predetermined time, for detecting a counter electromotive force of each of coils in the energized phase, and an activation driving state is selected according to magnitude of the detected counter electromotive force.

In US 2010/0250184 A1, an invention is disclosed that, in a brushless DC motor, information of rotation angle of a rotor and information of change of the rotation angle are acquired from output values of a counter for a rotary encoder at the time of a normal rotation and an inversion rotation, and generates angle information of multiple rotation.

In Japanese Patent No. 5401875, an invention is disclosed that, in an electric power steering apparatus, by inputting to a control device information of a steering torque T detected by a steering torque sensor, a motor angle θm detected by a motor angle sensor and a vehicle speed detection value Vs detected by a vehicle speed sensor, then an absolute steering angle estimated value θa is calculated by the control device, and the DC motor is controlled.

SUMMARY OF THE INVENTION

In order to control a brushless DC motor which drives each of driven components of an automobile etc. as a servo motor in a completely closed loop, accurate information including a rotating speed, a rotational phase, and a direction of the rotation etc. of the motor is required.

With the accurate information, safe operation of the automobile etc. becomes possible by performing activating/stopping, speed control and position control of the driven component etc.

In order to promote automatic operation or automatic operation control, more highly precise information is required, and absolute angle information or information on an absolute origin position (an absolute position) of the rotary shaft of the motor is also needed.

According to the invention described in JP 2015-149800A, since the Hall element is used, so that it is difficult to obtain resolution or absolute accuracy sufficient for discrimination of rotational speed and direction of rotation with high accuracy.

The invention described in JP 2017-034813A related to the sensor-less control is a system which the rotation angle of the motor is obtained by prediction, and since direct detection of the origin position is not carried out by any means, so that a measure for a repetition error is needed. Further, when adopting counter electromotive force detection, a certain means for initial position detection is required separately, because of starting from speed zero.

According to the invention described in US 2010/0250184 A1, position information corresponding to the absolute origin position is calculated by using data of one set of sensor elements, and angle information of multi rotations of a rotating body is generated. However, it does not disclose by any means to obtain the information on an origin position with high accuracy.

The invention described in Japanese Patent No. 5401875 also uses additional data of other components of control systems, such as a steering torque sensor besides a motor angle sensor, so that its composition is complicated.

The brushless DC servo motor which drives the various driven components of the automobile uses a battery mounted on the vehicle as a power supply. However, there may be a case where the driven component is not in a normal state when restarting, because after disappearance of the battery power source, the motor is driven intentionally with an external force. In order to further improve the safety of the automobile, it is desirable to be able to restart safely even in such a state. The consideration about the intentionally drive after such disappearance of the battery power source is not disclosed in the above patent documents.

One object of the present invention is to provide a brushless DC servo motor and its control device which can control the motor using a MR sensor unit by a fully closed loop with high precision based on output signal of the MR sensor unit.

Other object of the present invention is to provide a brushless DC servo motor and its control device which can determine whether the motor has been driven intentionally or not after disappearance of the battery power source, and enabled it to reboot various driven components safely.

According to one aspect of the present invention, a control device for a brushless DC servo motor comprising: a control unit for generating and outputting a driving signal and controlling electric power supplied to each of three phase stator coils of U phase, V phase, W phase of the brushless DC servo motor; and a MR sensor unit for detecting rotation of a rotor having a multipolar permanent magnet, wherein the MR sensor unit comprises, a flat plate magnet fixed to one end of a rotary shaft of the rotor and having a pair of N pole region and S pole region magnetized in the radial direction;

a pair of MR sensors fixed to a housing side at a position facing the magnet; and a processing circuit unit, wherein the processing circuit unit sets a position on a boundary line between the N pole region and the S pole region of the magnet as a magnet origin position, generates signals of phase A and phase B in accordance with the rotation of the rotary shaft based on the outputs of the pair of MR sensors, and outputs information on the magnet origin position, wherein the control unit comprises:

a function of generating each phase information of the U phase, the V phase, the W phase each of which synchronized with a rising phase of the output signal of the A phase or the B phase of the MR sensor unit according to the number of poles of the rotor, a function of obtaining an absolute origin position of the rotary shaft with respect to the driving signal based on the synchronization relationship of: a driving signal rising phase at which one of the three phase stator coils rises from zero; an integrated value peak phase of counter electromotive force to the one-phase stator coil obtained by driving the motor; and a rising phase of the output signals of the A phase or the B phase from the MR sensor unit corresponding to zero of the driving signal, and a function of setting a plurality of Z phase signals at 360 degree intervals synchronized with the rising of the A phase or B phase output signal corresponding to zero of the driving signal, wherein the magnet is fixed on the rotary shaft at a position where the origin position is synchronized with the absolute origin position of the rotary shaft, and wherein the control device is configured to drive the motor using the MR sensor unit as a rotary encoder of the U-phase, V-phase, and W-phase.

According to the present invention, it is possible to provide a brushless DC servo motor and its control device with a simple configuration using a MR sensor, capable of generating information on the absolute origin position of the rotary shaft of the motor, and controlling in a completely closed loop by synchronizing rotary encoders of the U-phase, V-phase and W-phase with the magnetic pole positions of the rotor.

According to other aspect of the present invention, the control unit of the brushless DC servo motor is mounted on an automobile, and the information on the absolute origin position is recorded in a EEPROM.

Therefore, by acquiring data from the EEPROM at the time of activation of the automobile, it has a function of determining whether or not the motor has been intentionally moved after electric power is no longer supplied from the battery, by acquiring data from the EEPROM at the time of activation of the automobile, and comparing the addresses of the acquired data, and a function of returning the motor, when it is judged that the motor has been intentionally moved, to the state at the moment when power is no longer supplied from the battery, based on the address of the acquired data.

Thereby, even when a motor drives intentionally after disappearance of a battery power source, a safe operation start can be realized at the next startup.

According to the present invention, a brushless DC servomotor and a control apparatus therefor capable of controlling the position of a driven component with extremely high accuracy can be provide, by using a MR sensor unit as a rotary encoder of the servomotor, generating phase information of each of Z-phase U-phase, V-phase and W-phase coils based on A phase and B phase signals of the rotary encoder, synchronizing each phase of the stator coil and the magnetic pole position of the rotor with the origin position, and performing servo control in a completely closed loop.

BRIEF DESCRIPTION OF THE DRAWINGS

FIG. 5A and FIG. 5B are a time chart showing a summary of initialization processing in the first embodiment.

BEST MODE FOR CARRYING OUT THE INVENTION

Embodiment 1

Hereinafter, embodiments of the present invention are described in detail, referring to Drawings.

Figure 1:
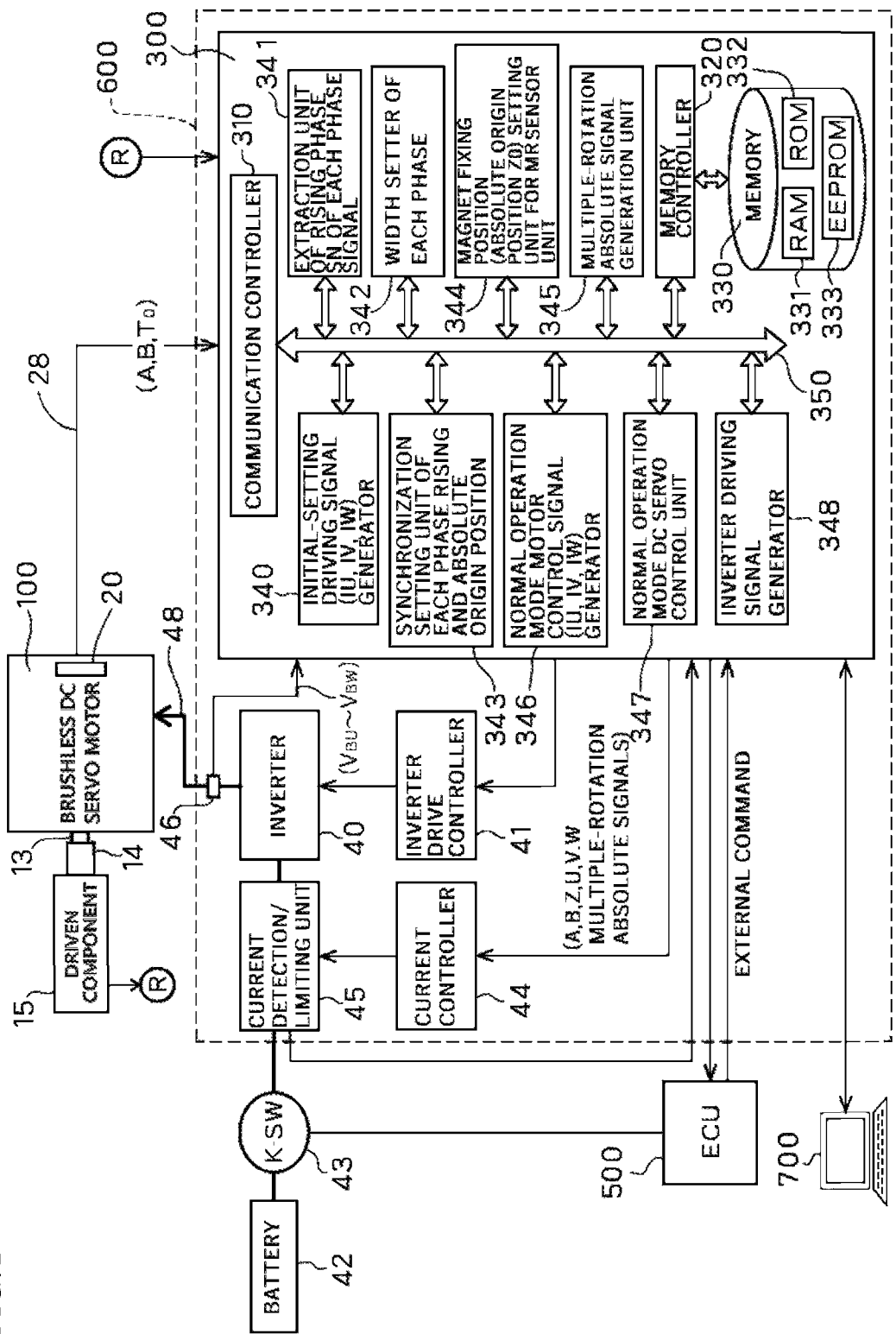
FIG. 1 is a functional block diagram showing an example of a control device for a brushless DC servo motor according to the first embodiment of the present invention.

FIG. 1 is a functional block diagram of a control device for a brushless DC servo motor according to the first embodiment of the present invention. The brushless DC servo motor 100 is a three phases brushless DC servo motor of an inner rotor type (Herein after, brushless DC servo motor). Reference numeral 300 denotes a control unit of the brushless DC servo motor.

A permanent magnet type rotor is integrally formed with a rotary shaft 13, and they are rotatably held by bearings provided in a housing of the brushless DC servo motor. Electric power with which current is controlled by a current controller 44 is supplied to each stator coil of the three-phase circuit (U phase, V phase, W phase) of the brushless DC servo motor 100, according to driving torque and speed command, etc., from a power supply terminal 48 via an ignition switch 43 and an inverter 40 from a battery 42. An inverter drive control unit 41 drives the inverter 40 to control the phase of the current supplied to each stator coil and rotates the rotor, based on a command from the control unit 300, The control unit 300 controls the maximum electric power and current which are supplied to the inverter 40 via a current detection/limiting unit 45, based on the current detected by the current detection/limiting unit 45. Reference numeral 46 is a counter electromotive force detector, which detects the counter electromotive force ($V_{BU}$, $V_{BV}$, $V_{BW}$) of the coil of each phase of the brushless DC servo motor 100 at the time of initial setting and transmits them to the control unit 300, as mentioned in detail later.

A MR sensor unit 20 which functions as a rotary encoder is provided to the one end part of the rotary shaft 13, and the MR sensor unit outputs an incremental signal (A, B) accompanying rotation of the rotary shaft 13. That is, each analog signal of the pair of MR sensors detected in the MR sensor unit 20 is converted to a digital signal respectively, and data (A, B) of each pulse of the incremental A-phase signal and B-phase signal are transmitted to the control unit 300 via a communication cable 28.

The pulse number of the signal of the A phase and B phase output for every rotation of brushless DC servo motor 100 is arbitrarily set up according to the resolution etc. which are needed for control. When a GMR is used as an element of the MR sensor, for example, 36000 output pulses of A phase, B phase respectively are obtained per rotation of the rotary shaft.

In the present invention, the position on the rotary shaft synchronous with the driving signal of the brushless DC servo motor is defined as an absolute origin position ($Z_0$). For example, a specific position in the circumferential direction on the rotary shaft corresponding to the rising position of the pulse of the A phase synchronized with zero of driving signal is defined as the absolute origin position ($Z_0$).

The position which corresponds to the zero of the output of the MR sensor unit 20, i.e., the specific position on the boundary line of the N pole region and the S pole region of a magnet, is defined as a magnet origin position ($T_0$). From the MR sensor unit 20, the information on the magnet origin position ($T_0$) is also output, and it is used at the time of initial setting, etc.

A pinion etc. which constitute a reduction gear 14 is provided on the other end of the brushless DC servo motor 100. Rotation of the rotary shaft 13 is slowed down with the reduction gear 14, and is transmitted to a driven component 15 directly or via a clutch. As the driven component 15, there are an oil pump, a water pump, an air pump, an engine control component, and a power steering, etc. of the automobile.

The control unit 300 of the brushless DC servo motor has functions such as, a communication controller 310, a memory controller 320, an initial-setting driving signal (iu, iv, iw) generator 340, an extraction unit of rising phase Sn of each phase signal 341, a width setter of each phase 342, a synchronization setting unit of each phase rising and absolute origin position 343, a magnet fixing position (absolute origin position $Z_0$) setter 344 of the MR sensor unit, a multiple-rotation absolute signal generation unit 345, a normal operation mode motor control signal (iu, iv, iw) generator 346, a normal operation mode DC servo control unit 347, and an inverter driving signal generator 348.

Although the control unit 300 also has a function of generating a command value of the current to the current control unit 44 similar to the known brushless DC servo motor, since they are not the characteristics of the present invention, hereinafter, the description of these configurations are omitted.

The control unit 300 is connected with the battery 42 via the switch 43, for example, an ignition switch, and generates a control signal for operating the driven component 15 by driving the brushless DC servo motor, based on input signals such as external commands from an upper level computer, for example, ECU (Electric Control Unit) 500 mounted on the automobile, and digital value of the signals of phase A and phase B which are outputs of the MR sensor 22, etc. That is, in the control unit 300 of the brushless DC servo motor, a multiple-rotation absolute signals of Z phase signal and each of U, V, W phase signal are generated based on the signals of phase A and phase B which are the outputs of the MR sensor unit 20. A part of information on the control unit 300 is transmitted also to an ECU 500.

The control unit 300 is configured to be able to communicate with a terminal equipment 700 in a factory manufacturing the brushless DC servo motor via a communication network. The terminal equipment 700 is configured to be capable of mutually communicating with another information processing device, for example, a computer and a server in a factory production line via the communication network.

In principle, the initial setting of the brushless DC servo motor starts up a program for initial setting of the control unit 300 with the terminal equipment 700, and the initial setting is performed. It is also possible to perform the initial setting of the brushless DC servo motor in scenes other than the factory line of the factory.

The control unit 300 of the brushless DC servo motor is realized as a dedicated ASIC (Application Specific Integrated Circuit) in which necessary functions are integrated into a single chip in the form of logic circuits, or it is realized as a chip of an IC circuit using a general-purpose single-chip microcomputer. Or is realized as a part of a function of a host computer. Although a specific configuration example using a general-purpose single-chip microcomputer will be described below, needless to saying that a control device for a brushless DC servo motor having the same function may be realized by a dedicated ASIC.

A single-chip microcomputer for realizing the control unit 300 is obtained by integrating a CPU, a memory, an oscillation circuit, a timer, a I/O interface, a serial I/F, etc. in one LSI, and respective functions of the control unit 300 of the brushless DC servo motor are realized by executing a program stored in the memory on the CPU. In the memory 330, ROM 331, RAM 332, and at least one of EEPROM 333, etc. are contained and they are connected with the CPU via a bus 350. In the ROM, constants which do not change during the program run at a power up or the time of reset or program execution are saved. A flash memory may be adopted as the ROM.

In the RAM, variables of a program, command values from the outside, data of the multiple-rotation absolute signals mentioned below, etc. are held. In the RAM, data of a target position of the driven component 15 and a target speed (an inverter sine wave driving signal, duty ratio of PWM controls) of the brushless DC servo motor which is set corresponding to the target position are also stored. In the EEPROM, absolute multi rotation signal are sequentially held one by one with operation of the brushless DC servo motor.

Generally, as compared with the other memory, since writing speed of the EEPROM is slow, data etc. are temporarily held in the RAM. The incremental data of signals of phase A and phase B held in the RAM are written (stored) in the EEPROM together with those address to be written in the EEPROM by an application program of the EEPROM and the driver. Reading of these data from the EEPROM to the RAM is also processed by the application program and the driver using the above address. Needless to saying that a signal other than a sinusoidal wave driving signal or a PWM signal may be used as a driving signal for driving the brushless DC servo motor.

Based on various kinds of signals of the command value and the MR sensor unit 20 which are stored in the memory 330, the control unit 300 calculates the rotating position of the brushless DC servo motor which drives the driven component 15, namely, the rotating position of the driven component 15, and the control unit generates information of inverter driving signals that supply a current to each of U, V and W phase coils of the brushless DC servo motor so that the driven component 15 can be operated at each of predetermined positions. The information on the inverter driving signal for the DC servo motor drive based on these signals is output to the inverter drive controller 41 via a serial communication line from the control unit 300 of the brushless DC servo motor.

In the normal operation mode, a servo control of brushless DC servo motor 100 is performed with the control unit 300 based on the information on the rotary encoder (the MR sensor unit 20). The driven component 15 is an object of the servo control by the control unit 300. The rotational speed, the rotating position, and the movement magnitude, etc. of the driven component 15 are detected with the apparatus encoder provided on the driven component, and the information (R) on the apparatus encoder is fed back to the control unit 300, and is used as reference information of the servo control.

Figure 2A:
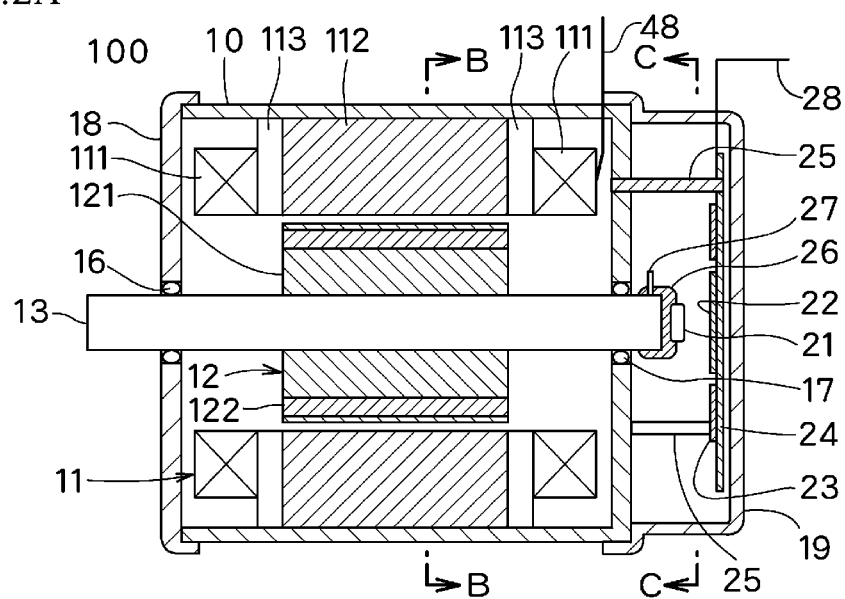
FIG. 2A is a longitudinal sectional view of the brushless DC servo motor according to the first embodiment.
Figure 2B:
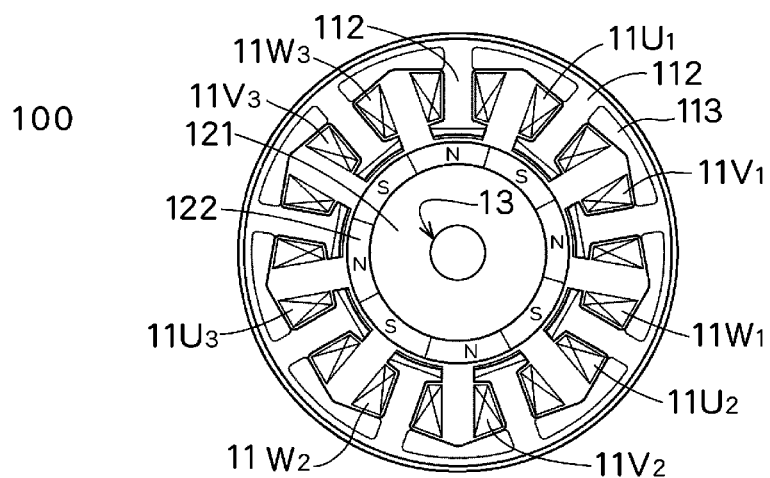
FIG. 2B is a B-B cross sectional view of FIG. 2A showing an example of a stator and a rotor of the brushless DC servo motor.

Next, the detailed configuration of an example of the brushless DC servo motor according to the first embodiment is described. FIG. 2A is a longitudinal sectional view of the brushless DC servo motor according to the first embodiment, and FIG. 2B is a B-B cross sectional view of FIG. 2A.

In the brushless DC servo motor 100, three-phase stator coils 11 are fixed inside a cup-shaped motor housing 10. The stator coil 11 comprises nine field cores 112 arranged at equal intervals circumferentially, and field coils 111 rolled around each of field cores via the insulating members 113 in the slot. The field core 112 is constituted laminating steel plates on an axial direction. The field coils 111 wound around the field magnetic field core 112 are classified into field coils of U phase, V phase and W phase, i.e., U phase coils (11U1-11U3), V phase coils (11V1-11V3), and W phase coils (11W1-11W3), according to the phase of the voltage applied from the inverter 40.

On the other hand, the rotor 12 which has a permanent magnet of eight poles is integrally formed with the rotary shaft 13, and these are rotatably held by a pair of bearings 16 and 17 provided in first end cover 18 and in the motor housing 10. The rotor 12 is an eight poles rotor which have a rotor yoke 121 fixed to the rotary shaft 13, and eight permanent magnets 122 fixed to the outer peripheral part of the rotor yoke.

The rotor yoke 121 is formed by laminating a plurality of disk-shaped steel plates in the axial direction and integrating them. The outer peripheral surface of the rotor 12 is opposing to the teeth of the stator core 11 via a gap.

The specific composition of the brushless DC servo motor 100, such as number of slot, number of poles of the magnet, specific constitution of the motor housing 10 and covering, are not limited to the above embodiment. For example, the direction of the cup shaped motor housing 10 is reversed left and right, the side cover in which the bearing 17 holding part and the support are formed is fixed to the opening on the right-hand side of motor housing, and further it may be made to fix a second end cover 19 on the side cover.

Figure 2C:
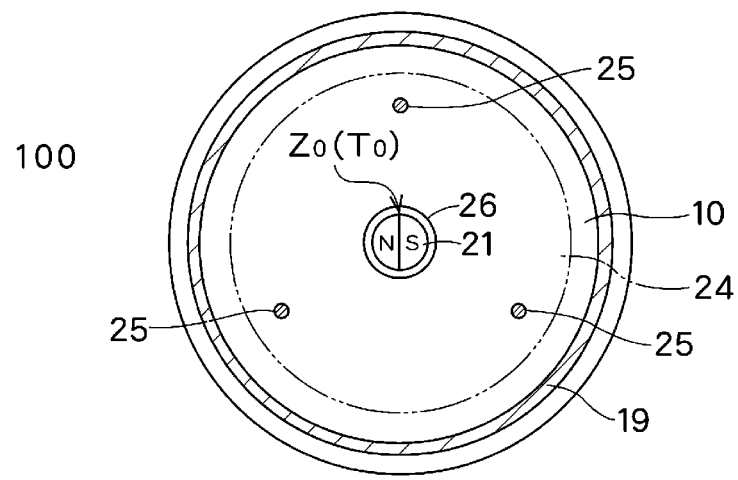
FIG. 2C is a C-C cross sectional view of FIG. 2A showing an example of an MR sensor unit.

Next, based on FIG. 2A and FIG. 2C, the relation of the brushless DC servo motor and the MR sensor unit is described. FIG. 2C is a C-C cross sectional view of FIG. 2A.

The MR sensor unit 20 comprises a plate-like magnet 21 which is fixed to the end surface of the rotary shaft 13 via a fixing member 26, a pair of MR sensors (a magnetic-resistance-element sensor) 22 which are separated in the position which opposes to the magnet 21 and fixed on the motor housing 10, and a processing circuit unit 23.

A pair of MR sensors 22 arranged to face a flat plate-shaped magnet 21 fixed to one end face of the rotary shaft 13 is one which detects a change in the resistance of the magnetic field due to the switching of the magnetic poles of the N pole and the S pole.

In the present invention, since the transverse magnetic field peculiar to the MR sensor is used, the magnet 21 is not multipolar magnetized but magnetized with one N pole and one S pole. The magnet 21 comprises a substrate made of a thin film of Si or a glass, and an alloy mainly composed of a ferromagnetic metal such as Ni, Fe etc. formed on the substrate.

As one pair of MR sensors 22 (22A, 22B), GMR, TMR, or AMR, etc. can be used, for example. The pair of MR sensors 22 are arranged with a predetermined interval in the rotation direction of the rotary shaft 13 so that the phases of the output pulses are shifted from each other by a predetermined angle, for example 90 degrees. A pair of magnetoresistance effect elements are connected in series, a voltage $V_{cc}$ is applied to both ends of the pair of magnetoresistance effect elements, and a voltage signal representing the potential of the connection point of both elements is an output of the MR sensor 22.

The MR sensor 22 and the processing circuit unit 23 are provided on the printed circuit board 24 of one sheet. This printed circuit board 24 is fixes to the side surface of the motor housing 10 by the plurality, for example, three supports 25 in a relationship that the MR sensor 22 opposes to the magnet 21, and each of center of rotation of the MR sensor 22 and the magnet 21 coincides with the axis of the rotary shaft 13, and printed circuit board is covered by the second end cover 19 of the nonmagnetic material.

On Drawings, in order to make it easy to understand, the protruding length of the rotary shaft 13 from the end of the motor housing 10 and the fixing member 26 are largely displayed. Practically, it is desirable short as much as possible for the protruding length, for example, about 3 mm. The fixing member 26 is a non-magnetic material, for example, a cup shape component made of resin, and the magnet 21 is integrally molded on one end thereof, for example. The fixing member 26 can be freely rotatable in a circumferential direction to the rotary shaft 13 in the state which the rotary shaft 13 is inserted in the cup shape hollow section, and the fixing member 26 is fixed to the rotary shaft 13 by a lock-pin 27 or adhesives.

In FIG. 2C, the magnet origin position ($T_O$) is the position of one end on the boundary line between the N pole region and the S pole region of the flat magnet 21 magnetized with one N pole and one S pole. This position should match the absolute origin position ($Z_O$) on the rotary shaft.

According to the present invention, at the final stage of the manufacturing process of the brushless DC servo motor, initial setting of a brushless DC servo motor is performed, and the magnet is fixed to the rotary shaft so that the magnet origin position ($T_O$) and the absolute origin position $Z_O$ coincide. Therefore, the absolute origin position $Z_O$ on the rotary shaft with respect to the driving signal is obtained in the stage where the stator and the rotor of the motor are assembled.

Specifically, the magnet 21 is temporary fixed to the rotary shaft and driving a brushless DC servo motor in the state where the second end cover 19 is not fixed to the right lateral of the motor housing 10, and then, the information on the phase of the output of the MR sensor, the information on the phase of integral value peak of counter electromotive force of the field coil of U phase and the information on the phase of the rise of the U phase coil corresponding to zero of an inverter driving signal are obtained.

Based on those synchronous relationships of each of these phases, the absolute origin position $Z_O$ on the rotary shaft is obtained. Then, the position of the magnet 21 on the rotary shaft is determined so that the phase of the magnet origin point ($T_O$) and the absolute origin position $Z_O$ coincide with each other, and then the magnet 21 is formally fixed to the rotary shaft.

The work of this initial setting is processed by workers themselves, using an arm of a working robot with a camera function, etc. for example. For this initial setting operation, and in order to ensure a predetermined magnetic sensitivity by a pair of MR sensors 22, it is desirable that the gap between the right side surface of the motor housing 10 and the pair of MR sensors 22 is a predetermined small gap, for example, a gap of 20 mm to 30 mm. Specific method of the initial setting is described in detail later.

Figure 3:
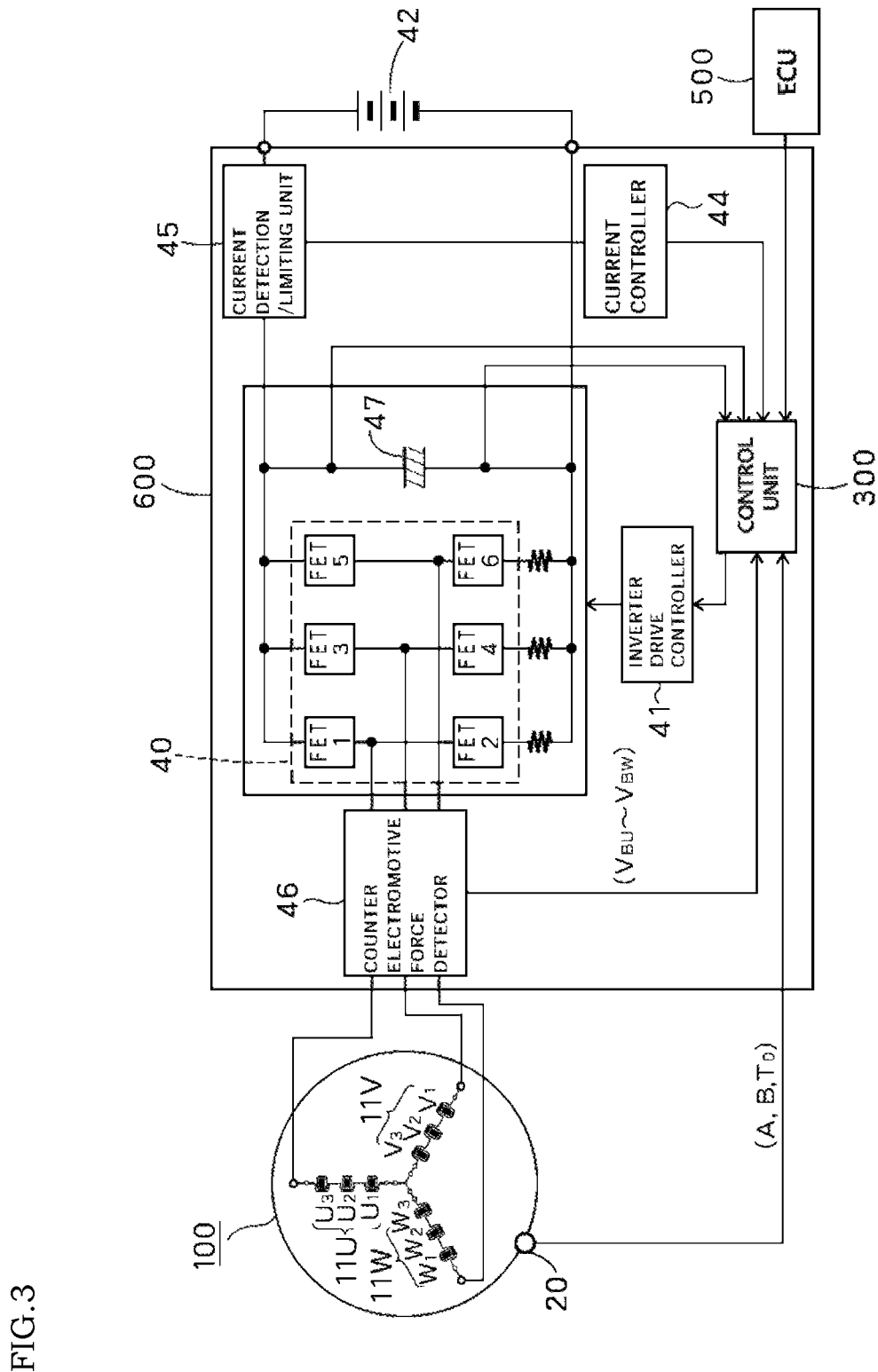
FIG. 3 is a diagram showing an example of a drive circuit of the brushless DC servo motor in the first embodiment.

FIG. 3 is a diagram showing an example of a drive circuit of the brushless DC servo motor in the first embodiment.

In each of the field coils 11U to 11W of each phase, coils of U1, U2 and U3 are connected in series, coils of V1, V2 and V3 are connected in series, and coils of W1, W2 and W3 are connected in series, respectively. One end of each of these three coil groups is connected by a neutral point.

The inverter 40 comprises six switching elements FET1-FET6 each of which comprising a FET transistor, an electrolytic capacitor 47, and resistance elements, etc. One end of each of the switching elements FET1-FET6 is connected to one of the coils 11U-11W of the U phase, the V phase, and the W phase of the brushless DC servo motor 100, and the other end is connected to the DC power supply 42. A voltage, that is, an inverter driving signal generated by the inverter drive controller 41 is applied between the gate and the source of each of the switching elements FET1-FET6. The electrolytic capacitor 47 is used for smoothing power supply voltage.

In the normal operation mode, the control unit 300 of the brushless DC servo motor continues the operation of the brushless DC servo motor 100, for example, a sine wave drive, based on the operation command and the control signal generated based on the normal operation mode motor control signals (iu, iv, iw) and the signals of phase A and phase B from the MR sensor unit 20. Thereby, the driven component 15 performs operation, in a predetermined working range, based on a predetermined operating pattern.

The control unit 300 of the brushless DC servo motor can be mounted, for example, on a printed circuit board 600 of one sheet with the inverter drive controller 41 and the inverter 40, and also it can be fixed to the position where is an inner side surface of the motor housing 10 or the second end cover 19 and near the MR sensor unit 20. In this case, the inverter 40 is connected to the power supply line in the vicinity of the power supply terminal 48 to the field coil 111. Depending on the environment where the brushless DC servo motor is installed, the printed circuit board 600 may be installed on the outside of the brushless DC servo motor. Power supply line, such as for the MR sensor unit 20 and for the printed circuit board 600, are omitted on Drawings.

The following respective functions realized by executing a program shown in the functional block form in FIG. 1 are displayed as an example; the communication controller 310, the memory controller 320, the initial-setting driving signal (iu, iv, iw) generator 340, the extraction unit of rising phase Sn of each phase signal 341, the width setter of each phase 342, the synchronization setting unit of each phase rising and absolute origin position 343, the magnet fixing position (absolute origin position ($Z_O$)) setter 344 of the MR sensor unit, the multiple-rotation absolute signal generation unit 345, the normal operation mode motor control signal (iu, iv, iw) generator 346, the normal operation mode DC servo control unit 347, and the inverter driving signal generator 348 etc. The division of each function is arbitrary, and it is needless to say that the plurality of functions may be realized by a common program, or a specific function may be realized by a plurality of different programs and IC circuits.

A part of program and the data of the memory related to the initial setting of the control unit 300 are shared with the terminal equipment 700 in a factory, or a server, and they may be constituted so that the terminal equipment 700 in the factory may share a part of processing of initial setting.

Figure 4A:
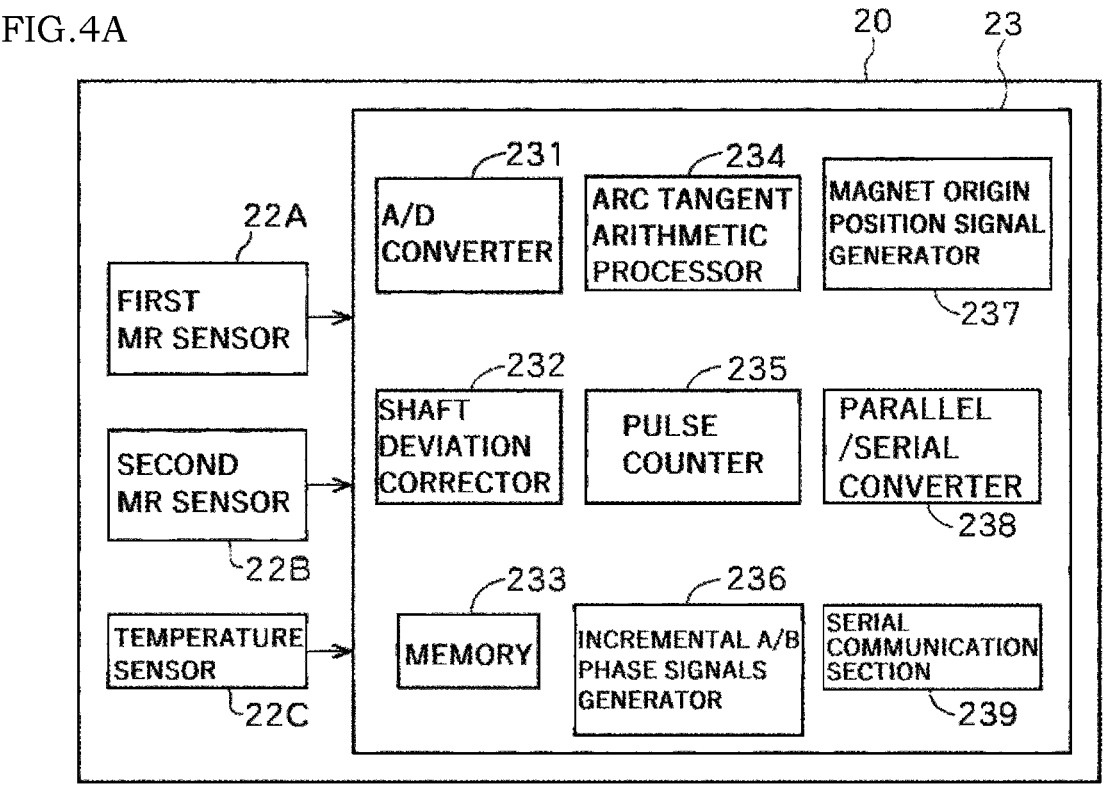
FIG. 4A is a diagram for explaining an example of a processing circuit unit of the MR sensor unit in the first embodiment.
Figure 4B:
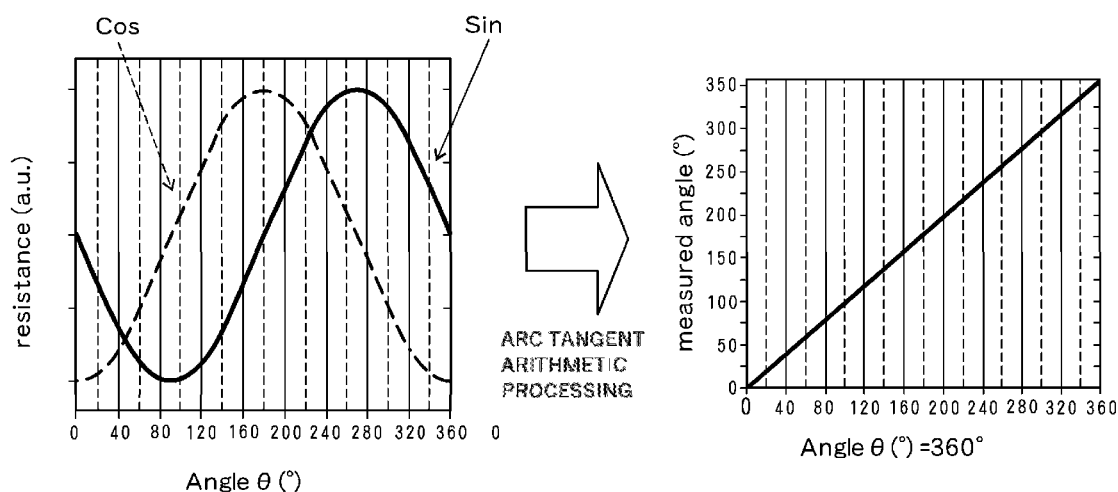
FIG. 4B is a diagram showing a concept of the processing method of output signals of the MR sensor in the first embodiment.

Next, about a configuration example and function of the MR sensor unit 20 are described referring to FIGS. 4A and 4B.

An embodiment of the processing circuit unit 23 of the MR sensor unit 20 is shown in FIG. 4A. The processing circuit unit 23 has each function of an A/D converter 231, a shaft deviation corrector 232, memories 233 such as RAM, an arc tangent arithmetic processor 234, a pulse counter 235, an incremental A/B phase signals generator 236, a magnet origin position signal ($T_0$) generator 237, a parallel serial converter 238, and a serial communication section 239. The processing circuit unit 23 is realized by running a program on a microcomputer with a memory, for example.

In the processing circuit unit 23, analog signal of one pair of MR sensors 22A and 22B are quantized, and those signal are divided into multiple parts by an electrical angle interpolation processing, and converted into A phase and B phase digital signals, for example, 36000 pulses per one rotation of the rotary shaft, respectively.

These A phase and B phase digital signals are subjected to an arc tangent processing in the arctangent processor 234, and are added by the pulse counter 235. These cumulative addition values are generated as incremental signals of phase A and phase B (hereinafter referred to as A/B phase signals) pulse data by the incremental A/B phase signals generating section 236, and held in the memory 233.

The concept of the processing method of the output signal of the MR sensor is shown in FIG. 4B.

The MR sensor 22 is provided such that the characteristic of changing the electric resistance value differs from the direction of the applied magnetic field. Therefore, when the magnet 21 rotates by the angle $\Theta$ and the direction of the magnetic field acting on each MR sensor rotates, the electric resistance value of the MR sensor, in other words, the voltage of the output signal of the MR sensor 22 fluctuates correspondingly. A pulse signal corresponding to one cycle is output for each of the SIN wave and the COS wave at every rotation 360° (mechanical angle) of the rotary shaft 13.

There is a possibility that the A/B phase signals which are acquired from one pair of MR sensors 22A and 22B may contain errors (mainly shaft deviation error) due to production error, installation error, temperature influence etc. of each sensor. That is, the A/B phase signals acquired as a result of the arc tangent processing should be placed on a straight line essentially in proportion to the angle of rotation $\Theta$ of the rotary shaft 13. However, due to errors such as shaft deviation, there are cases where repeated strains are included every 360 degrees or every 90 degrees of the phase difference of a pair of MR sensors.

In the shaft deviation corrector 232, based on the data for at least one rotation of the rotary shaft 13, the rotation center of one pair of MR sensors is extracted, and the existence of a strain of of the A/B-phase signals with respect to the rotation angle $\Theta$ is detected, and when there is a strain, those compensation processes are performed. In the magnet origin position signal generator 237, as a result of the arc tangent processing by the arc tangent arithmetic processor 234, synchronism with the position of angle 0 which appears every one rotation of the rotary shaft 13, generates and outputs a signal of the magnet original point position ($T_0$). The signal at the magnet origin position ($T_0$) is used as information for fixing the magnet 21 at the absolute origin position $Z_0$ of the rotary shaft.

The A/B phase signals and a magnet origin position ($T_0$) signal generated by parallel transmission processing in the parallel serial converter 238 are converted to the send data (BUS) for serial transmissions which suited the standard of serial transmission communication, and this BUS signal is transmitted to the control unit 300 of the brushless DC servo motor via the one communication cable 28 from a Serial communication section 239.

It is also possible that an up/down counter is adopted as the pulse counter 235 of the MR sensor unit, and generates A/B phase signals to which information on the direction of rotation of the rotary shaft 13 in the forward and reverse directions is also added to the cumulative addition and subtraction value of pulses, and to transmit them to the control unit 300 of the brushless DC servo motor. In the present invention, the count information with the information on the direction of rotation by such an up/down counter shall also be treated as an accumulation value. A magnet origin position ($T_0$) signal is a signal generated once for every rotation of the rotary shaft 13, it can also use also as a signal which detects rotational speed of the rotary shaft 13.

Figure 5A:
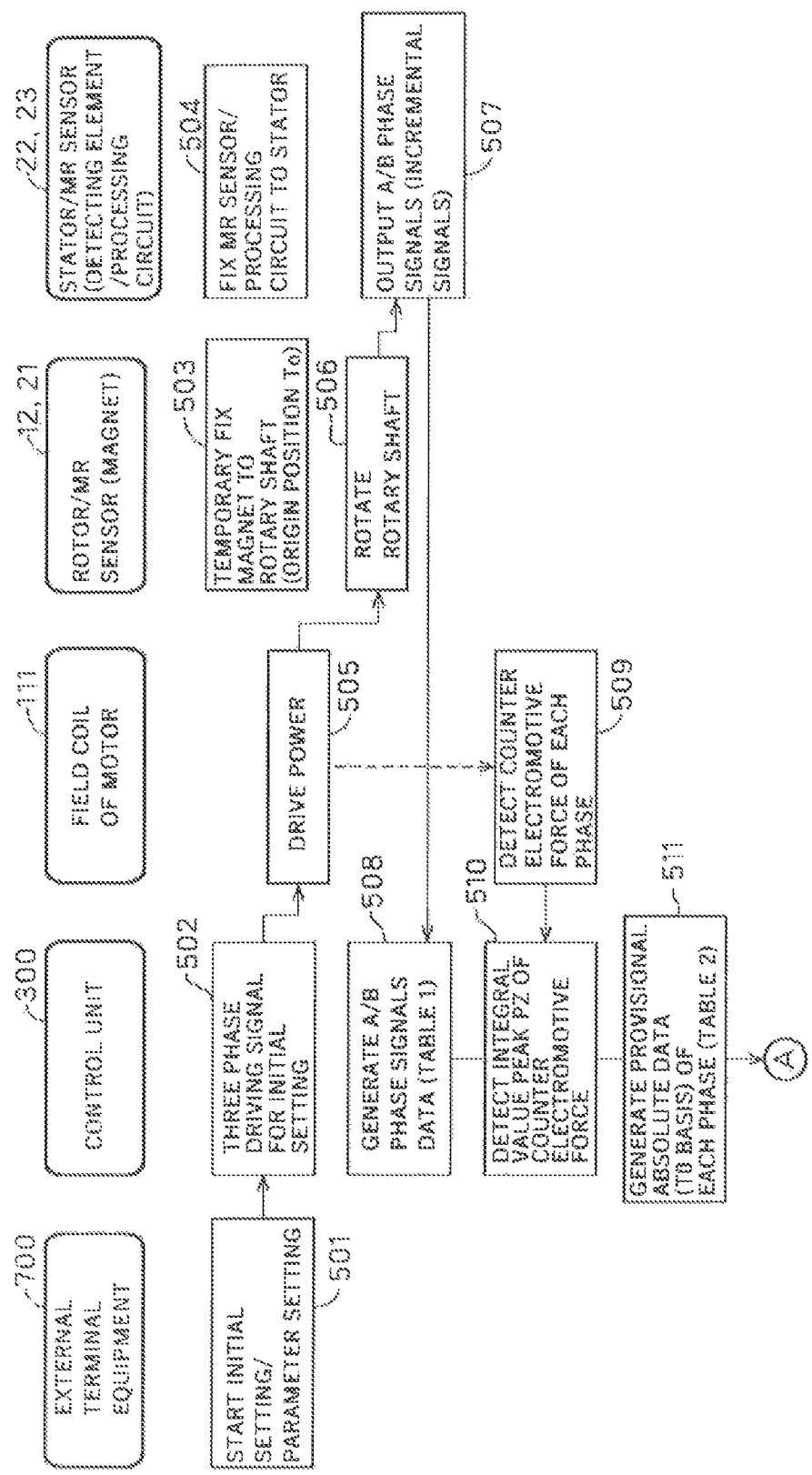

Next, the summary of initialization processing in the first embodiment is described referring to a time chart of FIGS. 5A and 5B.

The initial setting is started by starting a program related to initial setting of the control unit 300 and setting a required parameter from the external terminal equipment 700 (501).

In this stage, the magnet 21 is temporary fixed to the rotary shaft 13 of brushless DC servo motor 100 in any position (the magnet origin position ($T_0$)) (503), the pair of MR sensor 22 and the processing circuit unit 23 are fixed to the side surface of the motor housing 10 (504), and the second end cover 19 has not been fixed to the right lateral of the motor housing 10 yet.

In the control unit 300, along with activation of the program related to the initial setting, an arbitrary (predetermined) driving signal for the initial setting is generated and drive power is supplied to the three-phase stator coil of the DC servo motor (505). In connection with this processing, the rotary shaft and the magnet 21 of the MR sensor 20 rotates (506), and the output A/B phase signals and the information on the magnet origin position ($T_0$) are generated by the MR sensor (the sensor 22, the processing circuit unit 23) (507). In the control unit 300, a table of data of provisional A/B phase signals based on the predetermined driving signal, for example, a rectangular wave signal, is generated (508).

Table 1 shows an example of a provisional table of ($T_0$) basis generated by the MR sensor unit 20 and stored in the RAM of the control unit 300.

TABLE 1

| RAM address | origin position criteria ($T_0$) | A phase/B phase | Incremental (cumulative addition value) | Direction of rotation |
|---|---|---|---|---|
| 000520 | $T_0$ | A | 000219 | + |
| 000521 | | B | 0000219 | + |

TABLE 1-continued

| RAM address | origin position criteria ($T_0$) | A phase/B phase | Incremental (cumulative addition value) | Direction of rotation |
|---|---|---|---|---|
| 000522 | | A | 0000220 | + |
| 000523 | | B | 0000220 | + |
| 000524 | | A | 0000221 | + |
| 000525 | | B | 0000221 | + |

Then, the counter electromotive force of each phases in accordance with supply of the drive power to the stator coil is detected (509), and the integral value peak Pz of counter electromotive force is detected (510).

On the other hand, from the output signals of A/B phase of the MR sensor stored as the Table 1 based on the initial-setting driving signal (iu, iv, iw), phase information of each of the U, V, and W phase signals are generated according to the number of poles of the rotor 12. The phase information is a signal that rises at positive/negative rotation speeds of the motor in both forward and reverse directions, for example, at intervals of 120° in terms of electrical angle, and is necessary to rotate the motor by one rotation. In this embodiment, in order to rotate the rotor 12 once per mechanical angle of 45° (every 4500 pulses), a table of the phase information of each signal of U phase, V phase, and W phase is generated, as shown in Table 2.

Having described as U-up or V-up in the Table 2 show a rising phase of the signal of U phase or V phase. Each rise of the signal of U phase and V phase synchronizes with the rising phase of the A phase signal from the MR sensor unit 20. Similarly, the phase information of W-up which shows the rising phase of the signal of W phase, and U-dw, V-dw and W-dw which show the falling phase of each signal of U phase, V phase and W phase are also recorded on a table.

TABLE 2

| EEPROM address | U/V/W phase | provisional origin position | rotation speeds (Z phase) | A phase/B phase | absolute (cumulative addition value) | Direction of rotation |
|---|---|---|---|---|---|---|
| 0001520 | U-up | $T_0$ | 1 | A | 0000001 | + |
| 0001521 | U | | 1 | B | 0000001 | + |
| 0001522 | U | | 1 | A | 0000002 | + |
| 0001523 | U | | 1 | B | 0000002 | + |
| 0003020 | V-up | | 1 | A | 0001501 | + |
| 0003021 | V | | 1 | B | 0001501 | + |

Next, the magnet origin position ($T_0$), the output signals of A/B phases, rising phase Sn of each phase signal of U phase, V phase, and W phase are synchronized, and the Table 2 is generated as provisional absolute data (To basis) of each phase (511).

The table 2 shows an example of provisional absolute data of the U phase, which is recorded in the EEPROM of the control unit 300.

In this stage, it is not clear how the magnet origin position ($T_0$) corresponds to the absolute origin position of the MR sensor.

Based on the phase of the integral value peak Pz obtained before, the rising phase Sn of each signal of U phase, V phase, and W phase are extracted (512).

For the signals relating to the U, V, W phase coils, a width of the Z phase based on the $T_0$ basis is determined. Then, a table of the provisional absolute data which added the width signal of each phase is generated (513). The following table 3 shows an example of provisional absolute data of U phase which is recorded in the EEPROM of the control unit 300.

TABLE 3

| EEPROM address | U/V/W phase | magnet origin position/width of Z phase | A phase/B phase | Phase width (angle/period) |
|---|---|---|---|---|
| 0001520 | U -up | $T_0$ | A | 0 |
| 0001620 | U | Z1- width(1) | A | One pulse of A |
| 0001700 | U | Z1- width(2) | A | Two pulses of A |
| 0001670 | U | Z1- width(3) | A | One pulse of A |
| 0001770 | U | Z1- width(4) | A | Two pulses of A |

Next, in the synchronization setting unit of each phase rising and absolute origin position, an absolute origin position ($Z_0$) of the rotary shaft with respect to the driving signal is obtained on the basis of the relationship between the output of the MR sensor, the integral value peak and the rotation angle of the rotary shaft (514).

Thus, data on the "absolute origin position ($Z_0$) on the rotary shaft" based on the information on the integral values of the A/B phase signals and the U phase counter electromotive force corresponding to the initial setting driving signal is obtained.

For example, about U phase signal, absolute data as shown in the following table 4 is generated.

TABLE 4

| EEPROM address | U/V/W phase | absolute origin position | rotation speeds (Z phase) | A phase/B phase | absolute (cumulative addition value) | Direction of rotation |
|---|---|---|---|---|---|---|
| 0004505 | U-up | $Z_0$ | 1 | A | 0000001 | + |
| 0004506 | U | | 1 | B | 0000001 | + |
| 0004507 | U | | 1 | A | 0000002 | + |
| 0004508 | U | | 1 | B | 0000002 | + |

Upon completion of the series of processes so far, the control unit 300 then sends a request for positioning the magnet relative to the rotary shaft from the control unit 300 to the external terminal equipment 700 (515).

In response to the request, the control unit 300 sends an instructions "Fix the rotor, remove the temporary fixation of the magnet, rotate the magnet relative to the rotary shaft" to a working robot or a worker (516). The information on a magnet origin position ($T_0$) is acquired from the MR sensor 20 with rotation of the magnet 21 (517). The information on the magnet origin position ($T_0$) of the magnet 21 with respect to the rotary shaft is transmitted to the external terminal equipment 700 via the control unit 300 (518).

The working robot or the worker, etc. determines the position ($T_0=Z_0$) which should fix the magnet to the absolute origin position ($Z_0$) on the rotor based on the information on the magnet origin position ($T_0$) (519). In connection with this decision, the position to the rotary shaft of the magnet is set as the absolute position $Z_0$ (520), and the working robot fixes the magnet 21 to the rotary shaft (521). Further, the control unit 300 sends an instruction to "release fixing the rotor" to the working robot (522).

Then, the position data of all the signals acquired from the MR sensor unit are absolutely changed into position data of the origin position $Z_0$ basis, and they are connected with Z phase signal and "the width of Z phase", and the address of EEPROM are given. In this way, the position data is converted into a multiple-rotation absolute signal that represents the absolute origin position of the rotary shaft 13. That is, the provisional absolute data (($T_0$) basis) of each phase signal is corrected to $Z_0$ basis, and a table of absolute data is generated (523), and the table is recorded in the EEPROM.

Similarly, the multi rotation absolute data of each phase is generated (refer to FIG. 11B), and is recorded in the EEPROM 333 (524). In response to this processing, the initial setting is ended (525).

Next, the initialization processing is described in more detail.

Figure 6A:
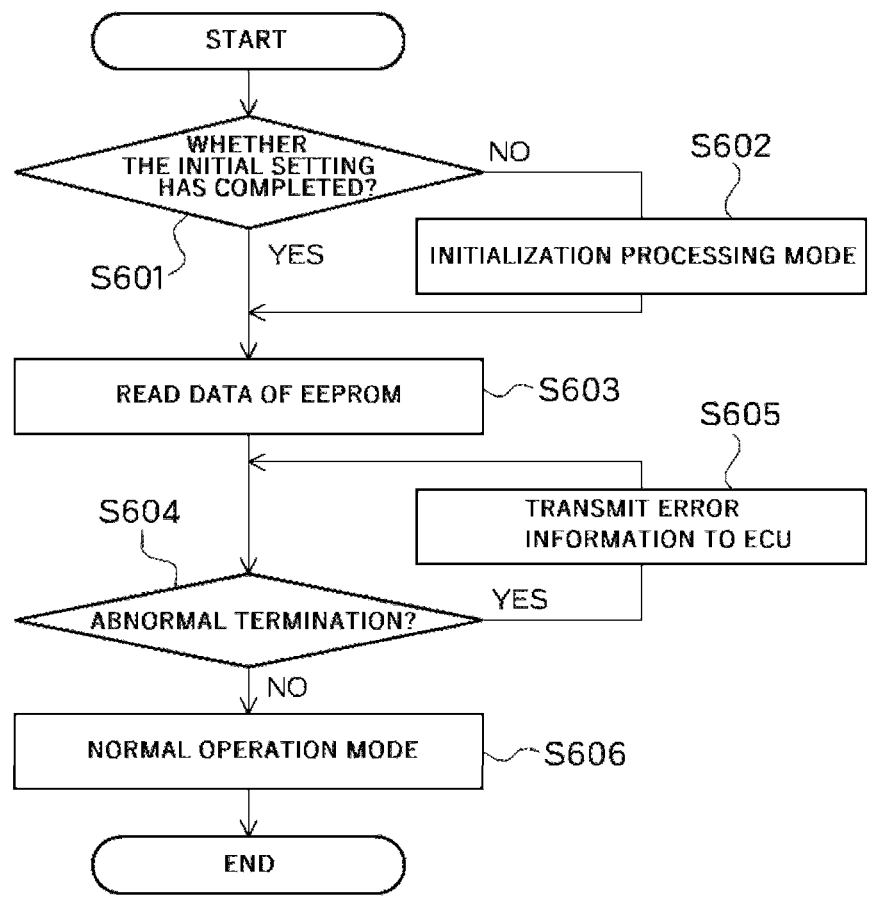
FIG. 6A is a flowchart showing a processing at the time of activation of an initialization program in a control unit of the first embodiment.

FIG. 6A is a flow chart which shows the processing at the time of starting of an initialization program in the control unit of the first embodiment according to the present invention. First, the control unit 300 of the brushless DC servo motor checks whether the initial setting has completed, immediately after power supply starting (S601). In the case of no, it starts an initialization processing mode (S602).

Figure 6B:
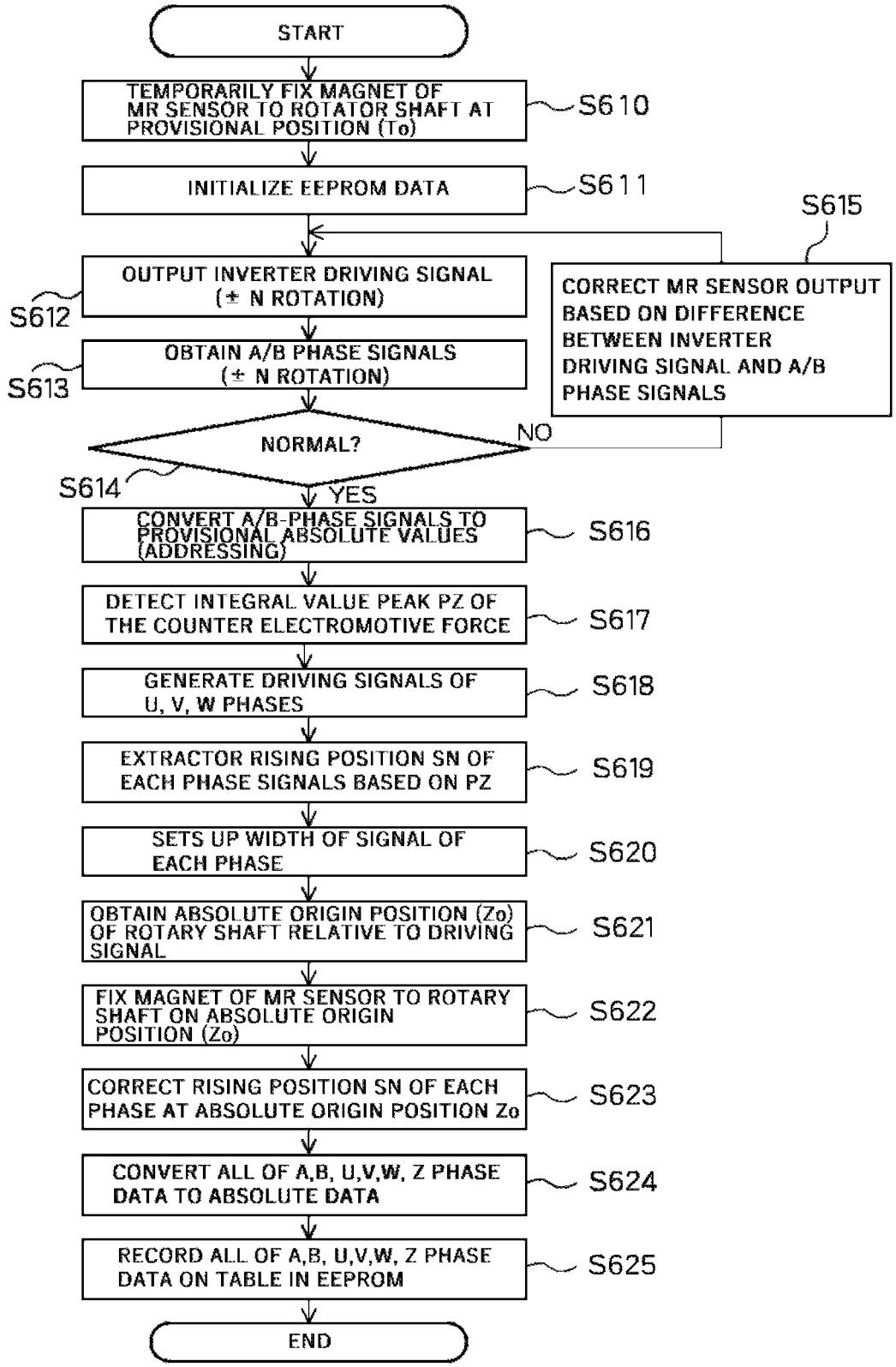
FIG. 6B is a flow chart showing details of an initialization processing in the processing at the time of starting shown in FIG. 6A.

The details of the initialization processing of the control unit 300 at the time of starting of the initialization program (S602) are shown in FIG. 6B.

In the initialization processing, the magnet of the MR sensor is temporarily fixed at the provisional position ($Z\alpha$) with respect to the rotator shaft (S610 in FIG. 6B). Next, EEPROM data is initialized (S611), and the initial-setting driving signal for the initial setting, for example, a PWM signal (±N rotation) for inverter driving, is generated by the initial-setting driving signal (iu, iv, iw) generator 340. The initial setting driving signals (iu, iv, iw) is sufficient that can drive the brushless DC servo motor by only one to several rotations in each of the positive and reverse directions across the zero rotation. This initial-setting driving signal is output to the inverter driving signal generator 348 (S612), and the brushless DC servo motor 100 is driven by the generated inverter driving signal (PWM signal).

The first driving signal at the time of the initial setting is replaced with a DC servo control signal of the brushless DC servo motor. Although the objective brushless DC servo motor is originally controlled to be closed loop, however, according to the initialization processing of the invention, in the state of open control, electric power is supplied with the initial-setting driving signal for the brushless DC servo motor to each coil of U phase, V phase, and W phase, and the brushless DC servo motor is driven (S613).

The obtained A/B phase signals are compared with the command value of the initialization processing, and it is determined whether the cumulative addition value is normal or not. That is, it is determined whether or not the cumulative addition value corresponds to the command value of the inverter driving signal and the response state of the brushless DC servo motor or the MR sensor are normal (S614).

When it is determined that there is an abnormality in the correspondence relationship, the output correction process such as correction of the temperature characteristic of the MR sensor etc. is separately performed so that the command value corresponds to the cumulative added value of the A/B phase signals (S615).

If the normal condition does not occur even if the output correction process is performed a plurality of times, since another cause such as an abnormality in the EEPROM itself can be considered, so any error display is made.

When it judged with the MR sensor being normal by S614, or when the correction process is made, next, the initialization processing converts the A/B phase signals acquired from the MR sensor unit 20 to absolute values (S616). That is, to each data of the A/B phase signals, addresses for writing is given (addressing) for storing to the EEPROM (address attachment). Thus, the data of a provisional absolute signal as shown in Table 1 is recorded in the EEPROM via RAM.

Next, the processing shifts to a series of processing for obtaining the absolute position of the magnet with respect to the rotator shaft, and for enabling generation of absolute signal data based on the absolute position information.

First, the counter electromotive force of each phase in accordance with supply of the drive power to a stator coil based on first driving signal is detected, and the integral value peak Pz of counter electromotive force is detected (S617).

The counter electromotive force detection unit 46 detects the counter electromotive forces $V_{bu}$, $V_{bv}$ and $V_{bw}$ of the time series of the coils of each phase, and transmits them to the control unit 300. In the control unit 300, the extraction unit of rising phase Sn of each phase signal 341 performs an integral operation of the counter electromotive force of each phase, and detects a peak position Pz where the integral value exceeds a predetermined threshold value.

Figure 7A:
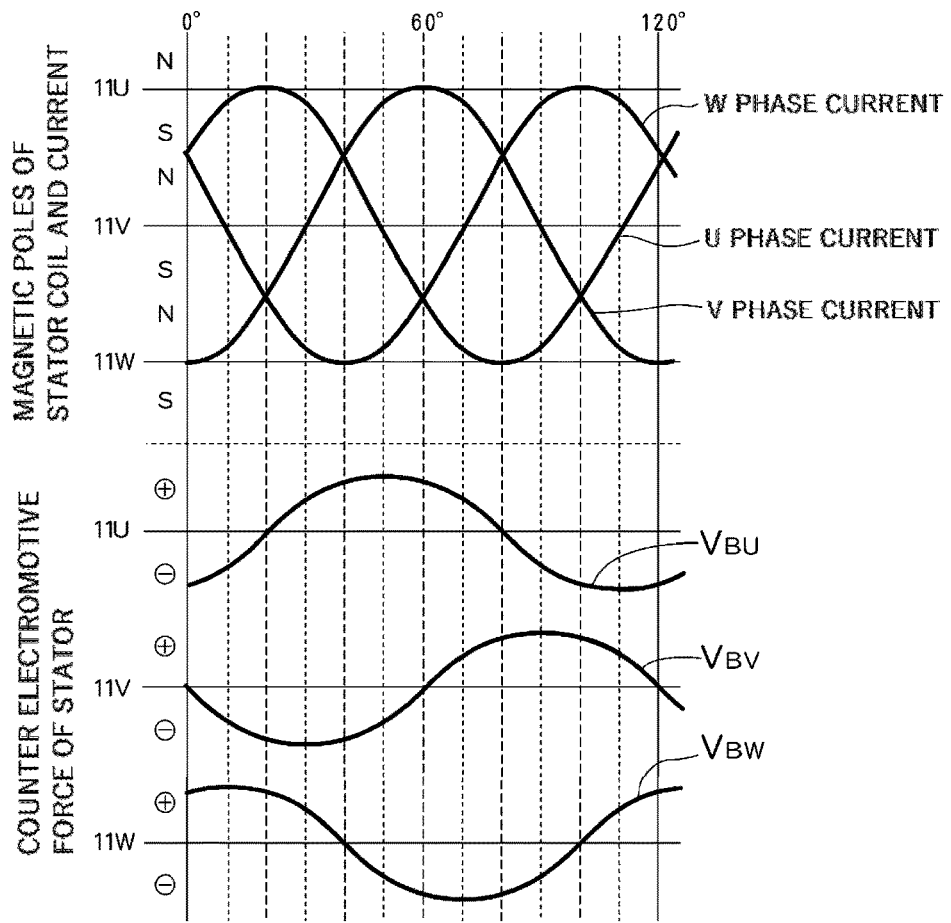
FIG. 7A is a diagram showing the relationship between the magnetic poles and the currents of the field coils of the stator and the relationship between the counter electromotive force, in a motor provided with a rotor which has a permanent magnet of eight poles.
Figure 7B:
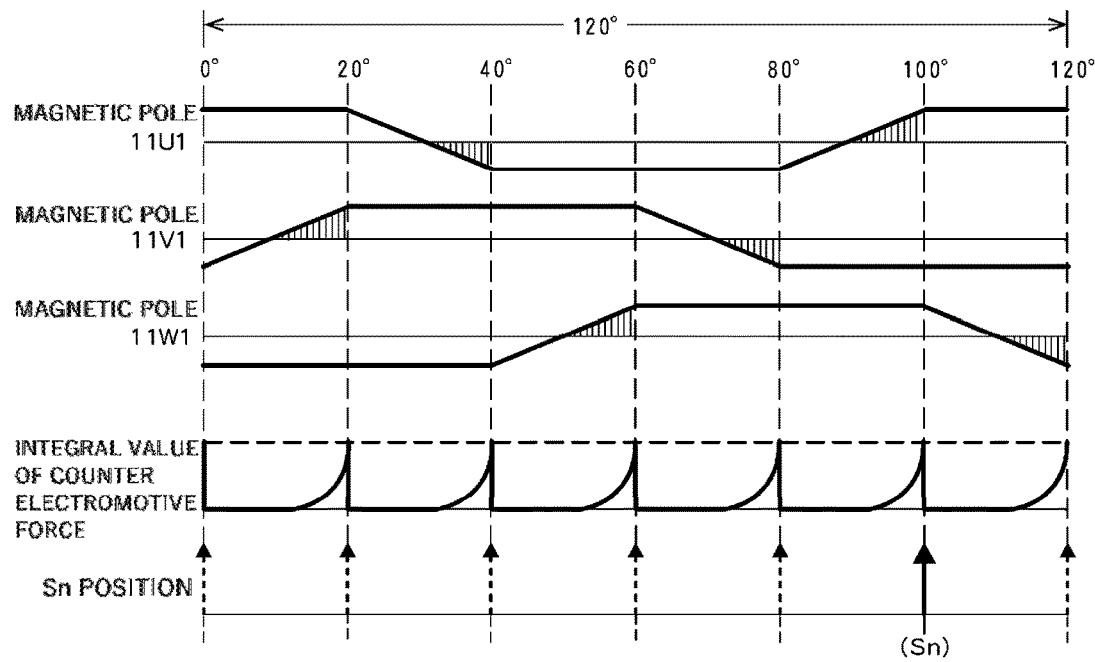
FIG. 7B is a diagram showing the integral value peak of the counter electromotive force of each phase and the relation of positioning information (Sn), at the initialization processing of the first embodiment.
Figure 8A:
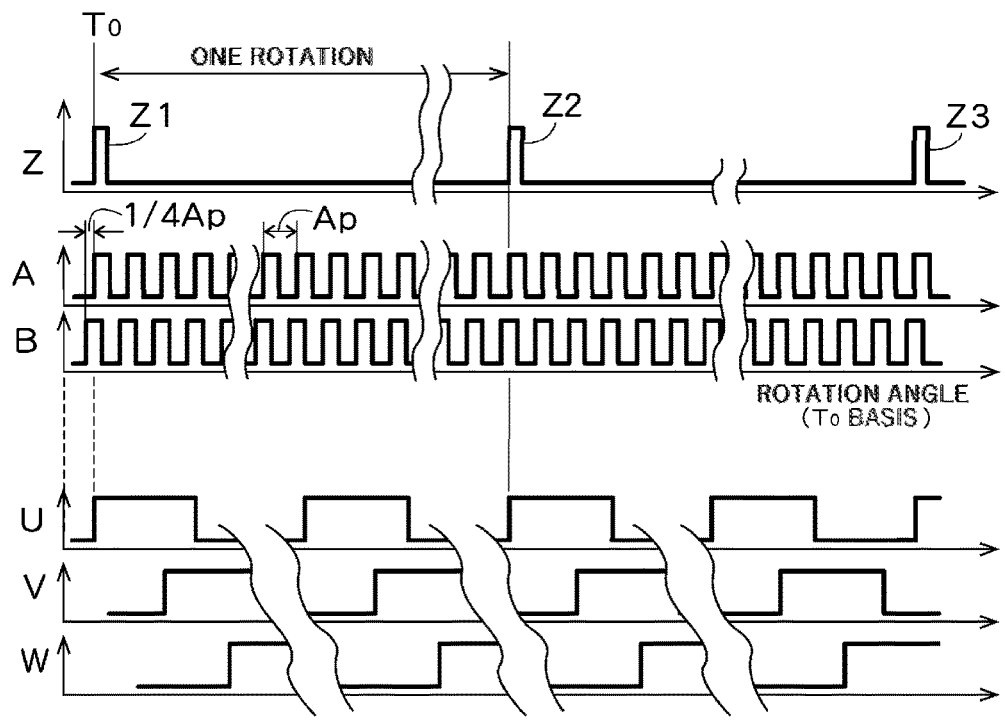
FIG. 8A is a diagram showing the relation of the signals of A phase and B phase output from the MR sensor unit, and each signal of Z phase, U phase, V phase, and W phase generated based on signals of phase A and phase B, in the first embodiment.

Referring to FIGS. 7A, 7B, and FIG. 8A, about detection of the counter electromotive force is described.

FIG. 7A is a diagram, in the DC servo motor provided with the rotor which has the permanent magnet of eight poles, showing the relation between the magnetic poles of the respective field coil of the stator and the current, and the relationship between the counter electromotive forces of the respective field coil. Here, the relation of only the range of 0°-120° (electrical angle) is shown.

The rotor 12 rotates by rotating the phase of the current supplied to each field coils 11U, 11V, and 11W of the stator. Depending to the size and direction of the current supplied to each of the field coils, counter electromotive force $V_{bu}$, $V_{bv}$, and $V_{bw}$ occur in each of field coils.

Next, the information on the positional relationship (magnet origin position ($T_0$)) of the MR sensor to the rotary shaft is obtained, from a relationship between the synchronization signals of the A/B phase output signals from the MR sensor unit and the driving signal to the stator coil of any one phase.

Therefore, first, the brushless DC servo motor 100 is driven in both directions of normal rotation and an inversion rotation. For example, driving signals of U, V, and W phases for generating one revolution in each of forward and reverse directions are generated (S618).

Namely, the synchronization setting unit of each phase rising and absolute origin position 343 has a function of generates the phase information of the U phase, the V phase and the W phase of the magnet origin position ($T_0$) basis (see Table 2 and FIG. 8A), corresponding to the initial setting driving signals (iu, iv, iw) and on the basis of the number of poles of the permanent magnet of the rotor 12 (eight poles in this embodiment).

FIG. 8A shows the relation of the signals of the A/B phase output from the MR sensor unit, and each signal of Z phase, U phase, V phase, and W phase generated based on the A/B phase signals.

The phase information of each signal of U phase, V phase, and W phase in S618 are different from the U, V, and W phase signals of the initial setting driving signal in S 612 in that the phase information signal is completely synchronized with the phases of the A/B phase output signals from the MR sensor unit 20 which functions as the rotary encoder.

The extraction unit of rising phase Sn of each phase signal 341 extracts a driving signal rising position (Sn) of each driving signal in the phase data of the U, V, W phase driving signals shown in Table 2 and FIG. 8A (S619).

FIG. 7B is a diagram showing relation of the counter electromotive force $V_{bu}$, $V_{bv}$, and $V_{bw}$ in each of field coils 11U-11W, its integral value peak, and the positioning information (Sn).

The integral value peak corresponds to a point in time at which the peak of each integral value exceeds a predetermined threshold and generates this as positioning information (Sn).

Here, focusing on the integrated value peak of the counter electromotive force of a specific phase, for example, U phase, the integral value peak is acquired in the position at 40° and 100° within the scope whose angle of rotation (electrical angle) is 120°. That is, about the field coil (11U1-11U3) of U phase, 6 times of integrated value peaks are obtained per rotation (360°). Similarly, 6 times per rotation of integral value peaks are respectively acquired also about the field coil (11V1-11V3) of V phase, and the field coil (11W1-11W3) of W phase.

Needless to saying that the position of this integral value peak varies depending on the configuration of each field coil of the stator.

Also about V phase and W phase, positioning information (Sn) may be determined and may be stored in the EEPROM, respectively. Multiple positioning information (Sn) may be generated for every rotation of the rotary shaft 13. Or the signal of a different kind with which resolution differs, for example, about 1 to 2 times per rotation of rough signals, and about tens of times per rotation of dense signals may be combined.

In the example of FIG. 8A, the rising position of the U phase signal and the rising position of the first A phase signal are synchronized with the magnet origin position ($T_0$). Further, Z phase signals (Z1, Z2, - - - , Zn) are set according to the magnet origin position ($T_0$) to 360° (mechanical angle) of every rotation of the rotary shaft 13.

The excitation current to the U phase coil increases from the rising position of the first A phase signal corresponding to the magnet origin position ($T_0$) of FIG. 8A, in other words, the rising position of the U phase signal. Therefore, in the example of FIG. 7B, the position of one integrated value peak per rotation of the rotary shaft 13, for example the position of the integration value peak of the rotation angle Θ=100° (electrical angle) where the excitation current to the U-phase coil is in the increasing direction, is defined as one "positioning information (Sn)" for obtaining the absolute magnet origin position of the MR sensor, and is recorded in the EEPROM.

Returning to FIG. 6B, next, the width setter of each phase 342 sets up the width of the signal of each phase coil (S620).

Figure 8B:
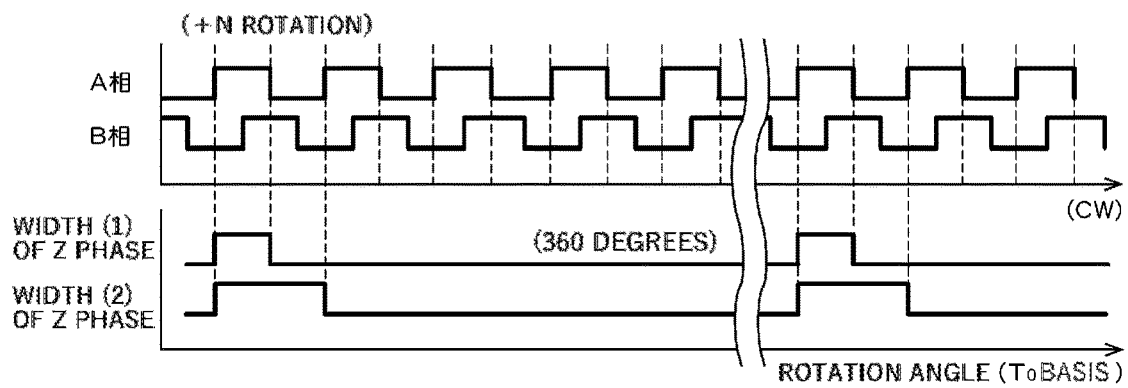
FIG. 8B is a diagram showing the relation of the output signal of the MR sensor and a width of Z phase, at the time of forward rotation instruction.

FIG. 8B is a diagram showing the output signals (A phase, B phase) of the MR sensor on the basis of the magnet origin position ($T_0$) at the time of forward rotation instructions as an inverter driving signal. The direction of the deviation of the phase is reversed according to the direction of rotation of the rotary shaft 13.

Here, a signal of "width of the Z phase (1)", synchronized with the rising position of the first A phase signal of each Z phase signal (Z1, Z2, -, -, Zn) and having a width corresponding to one pulse of the A phase signal, is decided. Furthermore, a signal of "width of the Z phase (2)", synchronized with the rising position of the A phase signal and having a width of several pulses of the A phase signal, is determined. The signal of "width of the Z phase (1)" and "width of the Z phase (2)" are signals repeated at intervals of 360° (mechanical angle), respectively.

Figure 8C:
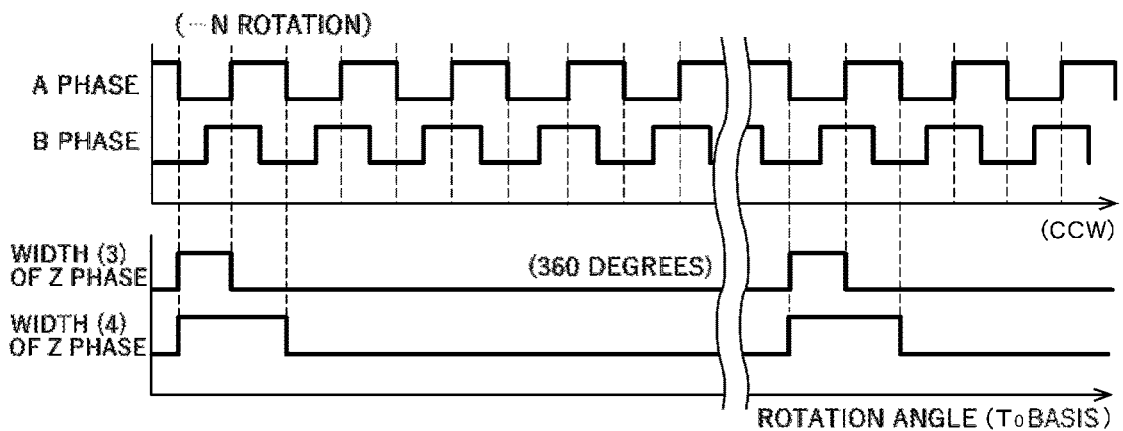
FIG. 8C is a diagram showing the relation of the output signal of the MR sensor and the width of Z phase, at the time of reverse rotation instruction.

Similarly, as shown in FIG. 8C, a signal of "width of the Z phase (3)", synchronized with the falling of the first A phase signal of each Z phase signal (Z1, Z2, -, -, Zn) and having a width corresponding to one pulse of the A phase signal, is decided. Furthermore, a signal of "Z phase width (4)", synchronized with the falling of the A phase signal and having a width of several pulses of the A phase signal, is determined. The signal of "width of the Z phase (3)" and "width of the Z phase (4)" are also signals repeated at intervals of 360 degrees, respectively. The cycle of "width of the Z phase" and the number of "width of the Z phase" can be set up arbitrarily, and is preliminarily recorded in the memory. They may be generated on the basis of the B phase signal.

The accumulation value of each of A/B phase signals of each of U phase, V phase, and W phase, each of which the Z phase signal is acquired, are then, converted to the accumulation value for every (every 360 degree) rotation of the rotary shaft 13, and they are combined with Z phase signal respectively, then, address of the EEPROM is added to each of the combined data, thereby they become the data of the provisional multiple-rotation absolute signal, as shown in Table 3.

Next, in the synchronization setting unit of each phase rising and absolute origin position 343, the absolute origin position ($Z_0$) of the rotary shaft with respect to the driving signal is obtained on the basis of the relationship between the output of the MR sensor, the integral value peak and the rotation angle of the rotary shaft (S621 of FIG. 6).

Figure 9:
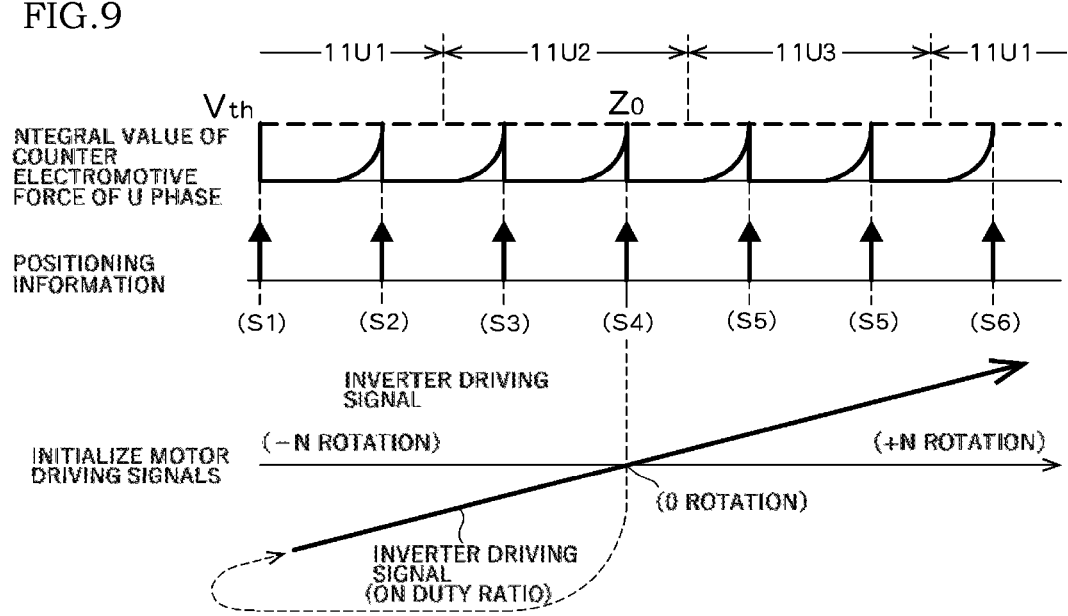
FIG. 9 is a time chart for explaining the process of finding the absolute origin position ($Z_0$) of the rotary shaft with respect to the driving signal.

FIG. 9 is a time chart for explaining a process of obtaining an absolute origin position ($Z_0$) of a rotary shaft with respect to the driving signal.

If an inverter driving signal is output and brushless DC servo motor 100 is driven both forward and reverse directions, A/B phase signals with which it corresponds to a command value (driving signal of U, V, and W phase) is acquired from the MR sensor unit 20. Also, in the extraction unit of rising phase Sn of each phase signal 341, based on the data from the counter electromotive force detection unit 46, a plurality of corresponding peak positions, that is, a plurality of positioning information (Sn) are acquired, as described above.

The positioning information (Sn) on the rotary shaft to which it corresponds to the origin position ($Z_0$) absolutely should be output for each rotation of the rotary shaft 13. Further, this positioning information (Sn) is defined as the position where corresponds at the rising time point corresponding to 0 degree of the A phase signal in the section which has an exciting current to the coil of any 1 phase of U, V, and W phases in the increasing direction. In this case, the rotary shaft needs to pass through this absolute origin position ($Z_0$) in the state of forward rotation of the brushless DC servo motor.

For that reason, in the synchronization setting unit of each phase rising and absolute origin position 343, as shown in the lower stage of FIG. 9, the brushless DC servo motor is started by the initial setting driving signal (inverter driving signal) and is rotated forward or reverse in a range including zero rotation there between.

When forward rotation of the brushless DC servo motor is carried out from −1 rotation to +1 rotation for example, while rotating from −1 rotation to zero rotation and rotating to +1 rotation, the integral value (peak value) of the counter electromotive force of U phase coil reaches threshold values, as shown in a middle stage and an upper stage of FIG. 9. Thus, positioning information (S1)-(S6) to which it corresponds at the rising time of each signal respectively are output.

Among those phases of the positioning information (S 1) to (S 6) where the integral value (peak value) of the U phase counter electromotive force reaches the threshold value, based on the above definition, it is determined that the phase of the positioning information (S4) is synchronized with the absolute origin position ($Z_0$) on the rotary shaft as shown in the lower part of FIG. 9, because the ON duty of the PWM signal of the U phase coil of the inverter driving signal is synchronized with zero.

Instead of the U phase coil, positioning information synchronous with the absolute origin position ($Z_0$) on the rotary shaft may be output based on the exciting current to the V phase coil or the W phase coil. Time information such as a transmit timing of the command value (PWM signal) of the initial-setting driving signal, the signals of A phase signal, B phase signal, U phase, V phase, and W phase and a receiving timing of the positioning information may be used for determination of the absolute origin position ($Z_0$) on the rotary shaft.

In this way, a table (Table 4) of absolute values is generated including the data that is a high precision "absolute origin position ($Z_0$) on the rotary shaft" data based on the information on the integral values of the high-resolution A/B phase signals and the U-phase counter electromotive force corresponding to the initial setting driving signal, and the data of phase information of each phase of the signals of each phase of U, V, W, that is, including the phase information of rotation speeds, each of the U, V, and W based on the absolute origin position ($Z_0$).

When a series of processing so far are completed, then, from the control unit 300 to the external terminal equipment 700, a command for positioning of the magnet is sent, in response to this command, the control unit 300 moves to a processing (S622) of positioning of the magnet by the magnet fixed position setter 344 of the MR sensor unit.

This magnet positioning processing is described referring to FIG. 10A-FIG. 10D.

Figure 10A:
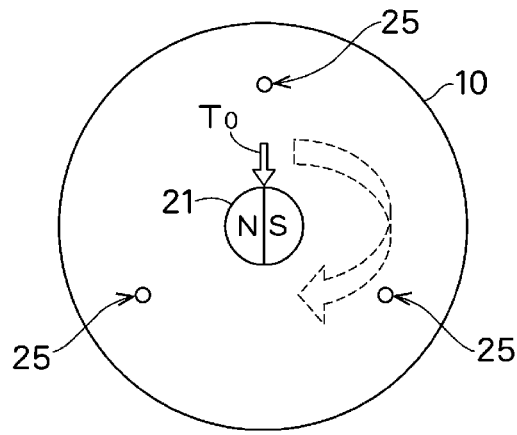
FIG. 10A is a diagram for explaining a positioning method of a magnet of the MR sensor unit.

At the time of initial setting, as shown in FIG. 10A, the magnet 21 is temporarily fixed to the rotary shaft 13 at any arbitrary angular position (at the magnet origin position ($T_0$)).

Figure 10B:
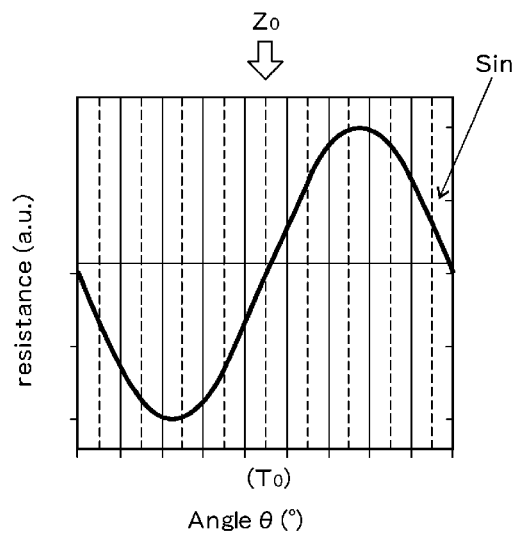
FIG. 10B is a diagram showing an example of the relationship between the rotational position of the magnet (a magnet origin position ($T_0$)) on the rotary shaft and the output of the MR sensor.

Next, where the rotary shaft 13 is fixed and when rotating the magnet 21 relatively to the rotary shaft 13, as shown in FIG. 10B, the output of the MR sensor 20 changes with respect to the rotation angle as shown by the sinusoidal wave form, and a magnet origin position ($T_0$) signal is output.

Figure 10C:
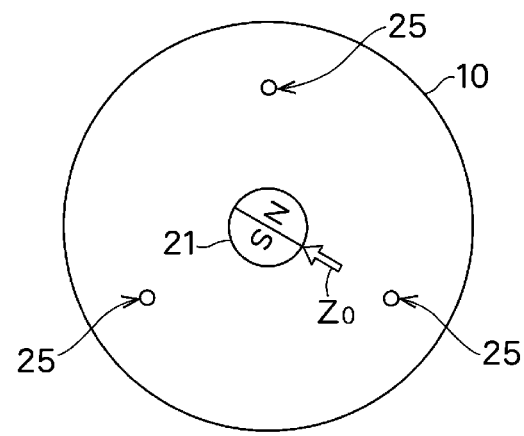
FIG. 10C is a diagram for explaining the positioning method of the magnet to the rotary shaft.

Then, as shown in FIG. 10C, the magnet 21 is rotated to the rotary shaft 13, and a position where the output (the magnet origin position ($T_0$) signal) of then MR sensor coincides with the absolute origin position ($Z_0$) previously obtained is found, and the magnet 21 is fixed to the rotary shaft 13 in this position. Thus, the magnet 21 is fixed to the absolute origin position ($Z_0$) on the rotary shaft 13. Namely, as for the magnet 21, the origin position ($T_0$) of this magnet is fixed to the position on the rotary shaft 13 where is synchronized with the absolute origin position ($Z_0$).

Strictly, by the method of this embodiment, there is a possibility that it contains some error that positioning of the magnet 21 to the resolution (about 36000 pulses) of the MR sensor is assumed. It is defined that "absolute origin position" of the magnet 21 of the present invention includes such a minute error. Once this absolute origin position ($Z_0$) is set up between the magnet 21 and the rotary shaft, it is output as invariant position information with no repetitive error. Therefore, it is convenient in any way practically as information on "absolute origin position" for control of the brushless motor which performs servo control.

Figure 10D:
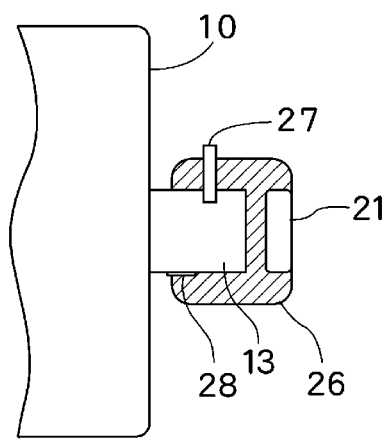
FIG. 10D is a diagram for explaining the fixing method of the position of the magnet to the rotary shaft.

FIG. 10D shows an embodiment of a position fixing method of the magnet 21 to the rotary shaft 13. With the lock-pin 27, the adhesives 28, etc., the fixing member 26 is fixed to the rotary shaft 13.

From the information, the relation of the driving signal and the angle of the magnet on the rotary shaft is found, and the magnet can be relatively rotated to the rotary shaft. That is, the rising position Sn of each phase is corrected at the absolute origin position $Z_0$, and the provisional multiple-rotation absolute signal data are convert to multi-turn and absolute signal data, based on the absolute origin position (S623). Thereby, it becomes possible to synchronize the driving signal and the output of the MR sensor completely.

Next, all the A/B phase signals obtained from the MR sensor unit are related to the absolute position $Z_0$ of each phase signal and the Z phase signal, and "width of the Z phase", and is given the address of the EEPROM, so that it is converted into a multiple-rotation absolute signal that represents the absolute origin position of the rotary shaft 13 (S624).

In the control unit 300, as the result of the initialization processing, the provisional absolute data ($T_0$ basis) of each phase signal is corrected to the data of $Z_0$ basis, and the absolute data of multi rotation is generated (S624).

Figure 11A:
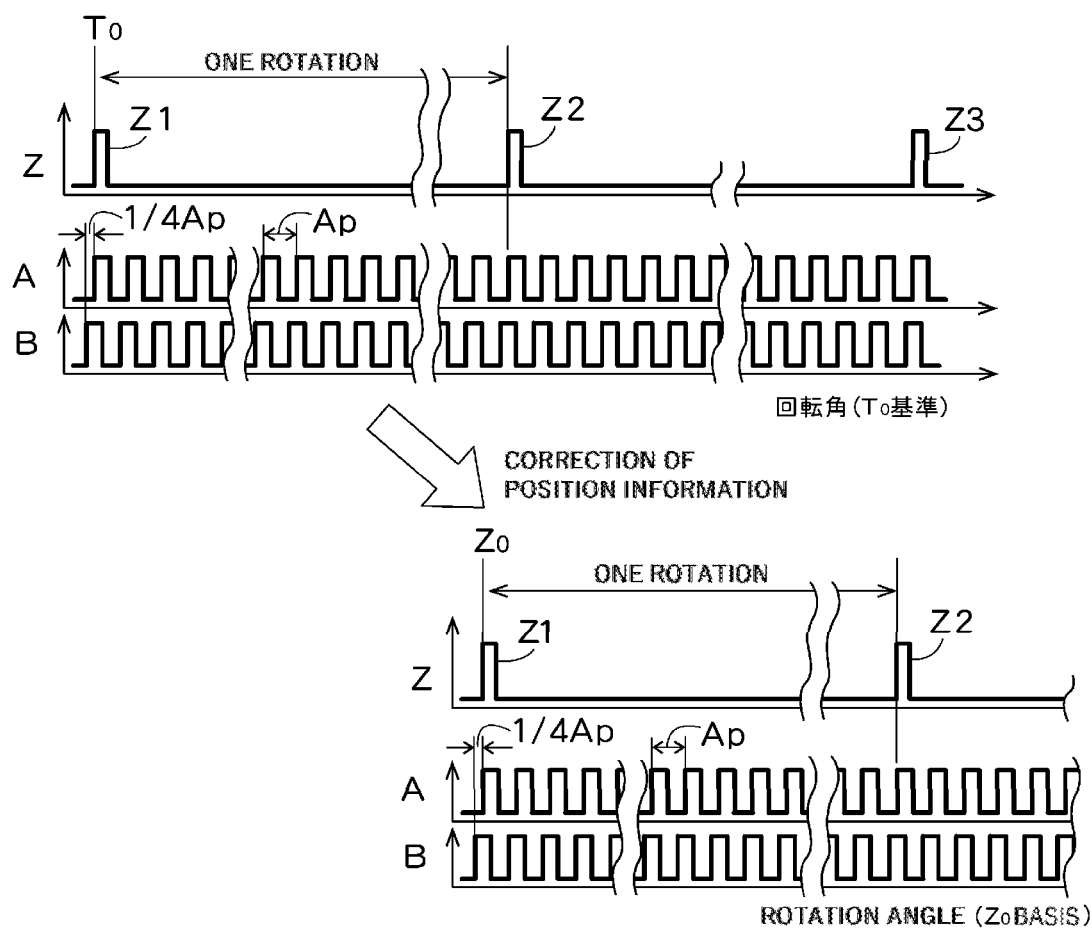
FIG. 11A is a diagram showing an example of converting the data of signals on the A phase, the B phase and the Z phase, from the magnet original point position ($T_0$) basis to the absolute origin point ($Z_0$) basis.

FIG. 11A is an example which converts the phase data of A phase signal, B phase signal and the Z phase based on the magnet origin position ($T_0$) to the absolute data of the multi rotation of $Z_0$ basis.

In the control unit 300, the absolute data of the multi rotation of $Z_0$ basis is recorded in the EEPROM 333 (S625).

Figure 11B:
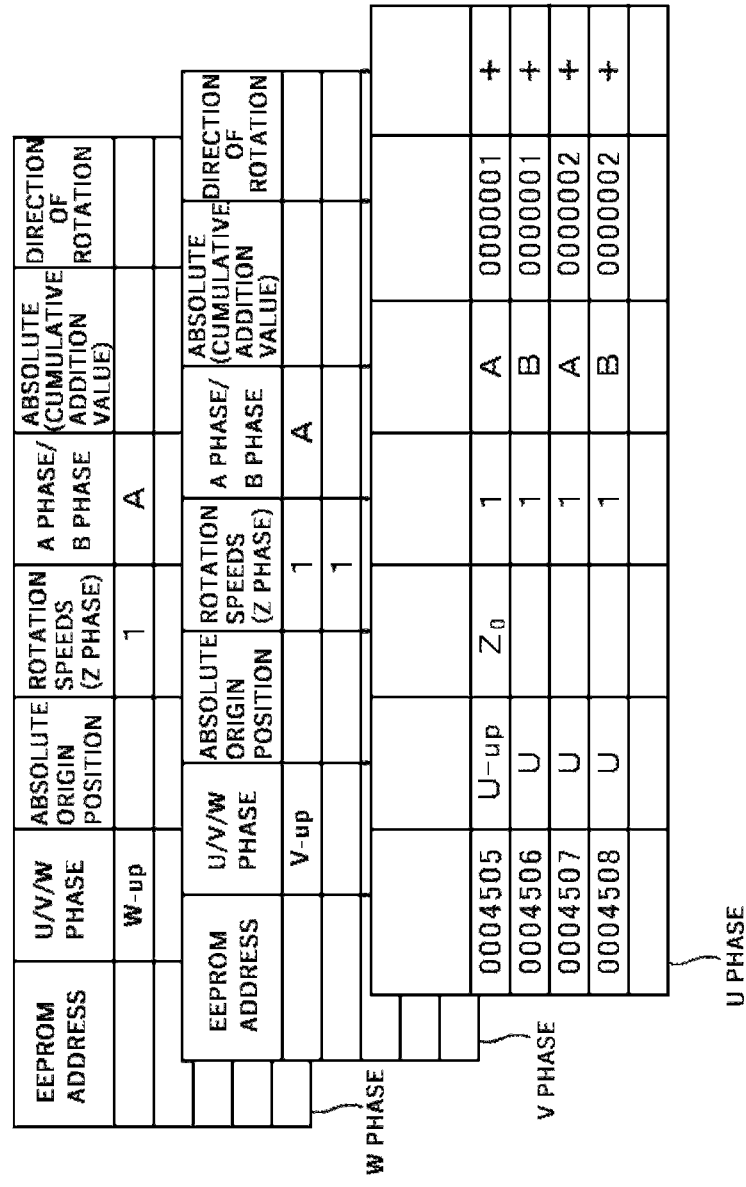
FIG. 11B is a diagram showing an example of the absolute data about signals of the A phase, the B phase and the Z of each coil of U phase, V phase, and W phase which are recorded in the EEPROM based on the result of the initialization processing.

FIG. 11B is an example of the data recorded in the EEPROM about the phase data of A phase, B phase and Z phase related to each coil of U phase, V phase, and W phase.

For example, each data in FIG. 11B can be used as a table for current controller of each coil, that is a table giving absolute information etc. on the rotation speed, rotation angle or phase of each phase coil of A phase signal, B phase signal, Z phase and U phase, V phase, and W phase based on $Z_0$ basis. Each "width of the Z phase (1)"-"width of the Z phase (4)" (not shown) is used for generating various kinds of control signals of the brushless DC servo motor, such as an inverter driving signal.

Returns to FIG. 6A, when the initialization processing is finished, next, it moves to abnormal termination judgment mode. In this mode, the data of the absolute signal of multi rotation is read from EEPROM via RAM (S603) and based on the data of the absolute signal that has read, it is judged whether the previous operation of the brushless DC servo motor has terminated normal or abnormal condition (S604).

If it is normal termination, the data of the absolute signal of EEPROM should be corresponding to position, i.e., absolute origin position $Z_O$ of the absolute value 0 of the rotary shaft at the time of starting of a brushless DC servo motor. If the data of the absolute signal is far from the absolute value 0, it will be judged with it having been abnormal termination. In the case of abnormal termination, error information is transmitted to upper level ECU (S605), and the restoration processing towards operation resumption of the driven component 15 is made from the ECU side.

If normal termination, the control unit 300 of the brushless DC servo motor moves to a normal operation mode (S606).

The information on the integral value of counter electromotive force $V_{BU}$ of the coil of each phase is used only for the initialization processing, and, originally it is unnecessary in a normal operation mode. Therefore, if the initialization processing is completed, record in the memory of the data of positioning information (Sn) received from the MR sensor unit may stop. On the contrary, the information on the integral value of counter electromotive force $V_{BU}$ may be used as as a fail-safe function for the MR sensor.

Sometimes, a brushless DC servo motor for automobiles is required to more accurately determine the absolute origin position $Z_O$ in order to perform highly accurate control as a drive source of a driven component. In order to meet such a demand, the origin position can also be determined based on dense positioning information or based on a combination of coarse and dense positioning information.

Figure 12:
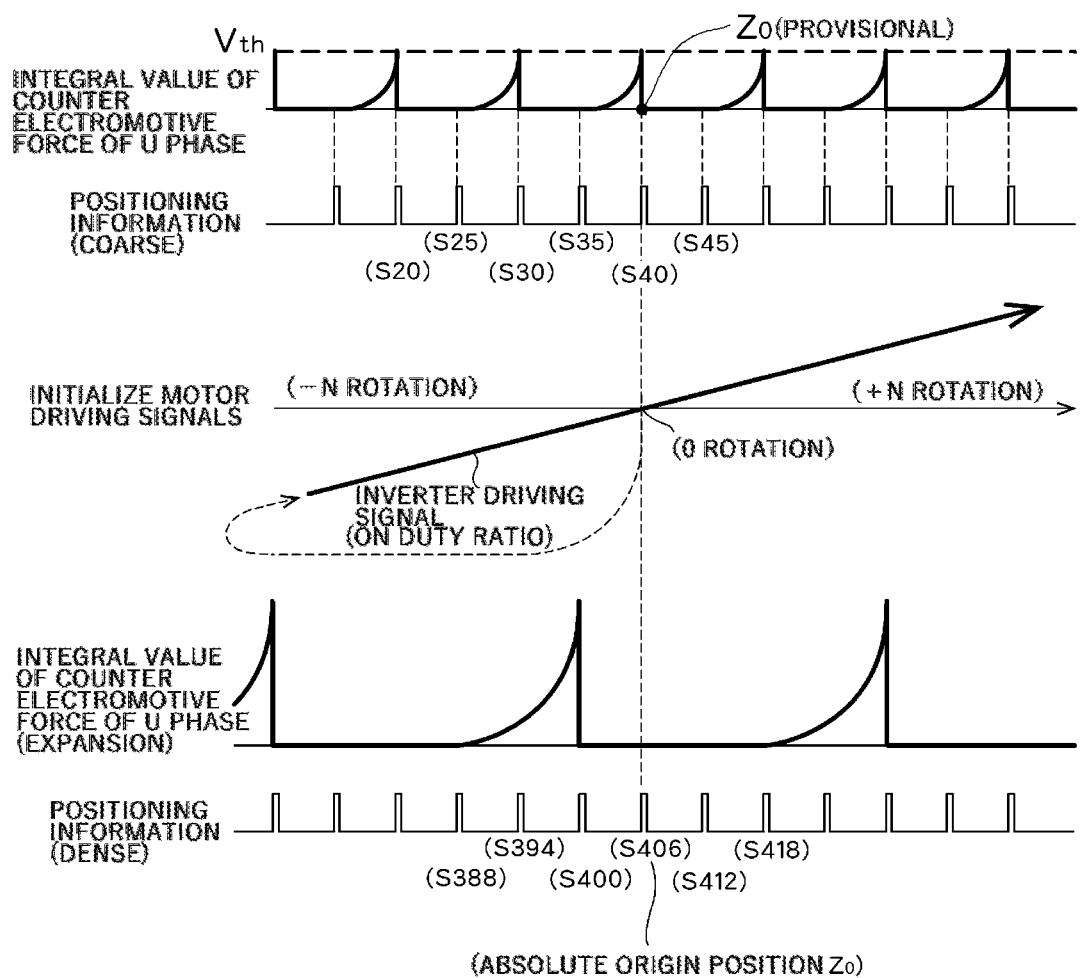
FIG. 12 is a time chart for explaining the process of determining the absolute origin position ($Z_0$) of the rotary shaft with respect to a driving signal based on a combination of coarse positioning information and dense positioning information.

FIG. 12 is a time chart for explaining the process of determining the absolute origin position ($Z_O$) of the rotary shaft with respect to the driving signal based on a combination of coarse positioning information and dense positioning information. In the example of FIG. 12, as the positioning information based on the integrated value peak of the counter electromotive force $V_{BU}$, coarse positioning information once per rotation of the rotary shaft by 180 degrees and dense positioning information once per rotation of the rotary shaft by 6 degrees are outputted.

First, the position where the on-duty of the PWM signal of the U-phase coil for inverter driving synchronized with zero among the coarse positioning information (-, S20, -, S45, -), in this example, the position of the positioning information (S 40), is temporarily determined to the absolute origin position ($Z_O$) synchronized with the rising point of the A-phase pulse. Next, dense positioning information (-, S388, -, -, S418, -) is adopted for the vicinity of the provisional determination position (S 40), and the position where the on-duty of the PWM signal is synchronized with zero near the provisionally determined position (S 40), in this example, the position of the positioning information (S 406) based on the integral value peak of the counter electromotive force $V_{BU}$, is formally decided to the absolute origin position ($Z_O$). Thus, the absolute origin position ($Z_O$) of quite high accuracy can be determined. Therefore, it is possible to shorten the processing time of the subsequent magnet positioning process S621-S622 in FIG. 6 and improve the accuracy.

Figure 13:
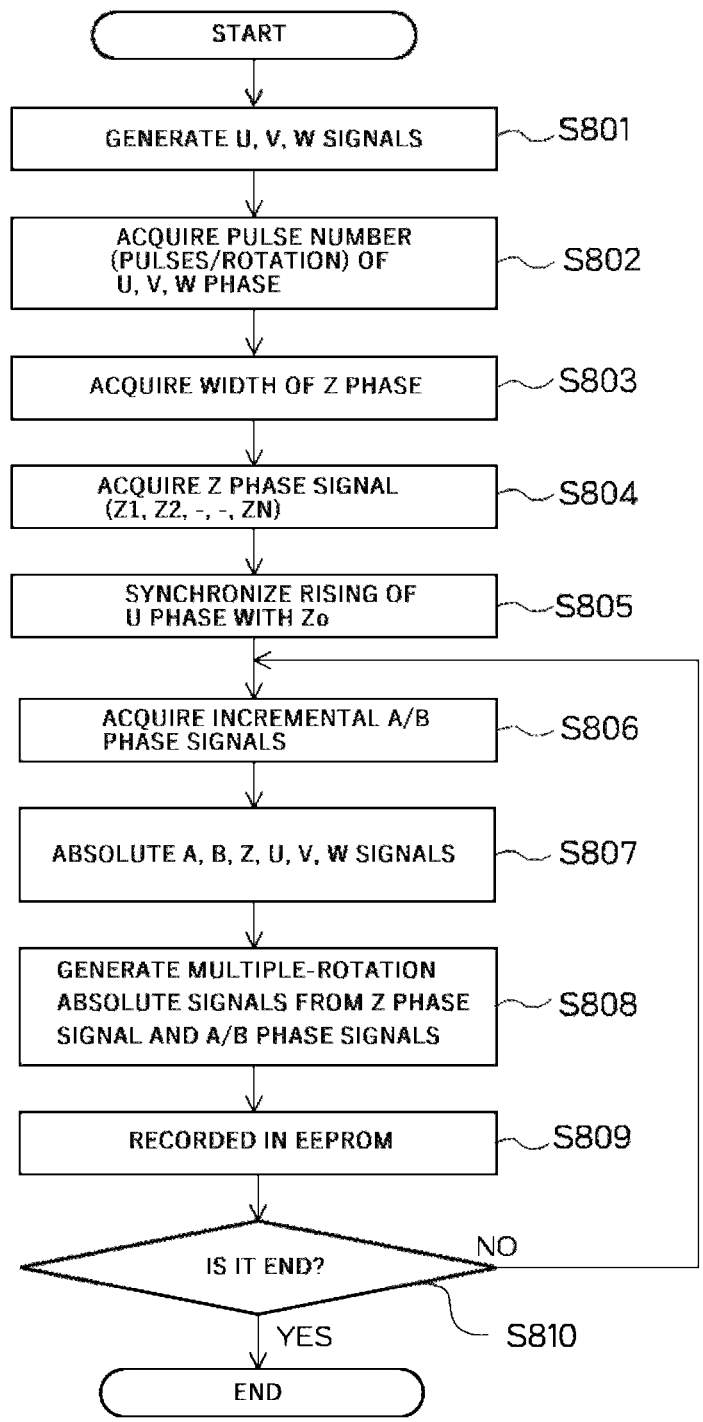
FIG. 13 is a flow chart showing the details of signal processing of the control unit at the normal operation mode in the first embodiment.

FIG. 13 is a flow chart showing the details of signal processing of a control unit at the time of the normal operation mode in the first embodiment.

In the normal operation mode, the control unit 300 of the brushless DC servo motor causes the brushless DC servo motor to function as a rotary encoder, by operating the multiple-rotation absolute signal generation unit 345, the normal operation mode motor control signal (iu, iv, iw) generator 346, the normal operation mode DC servo control unit 347, the inverter driving signal generator 348, etc. based on the external command and the information of the EEPROM 333 and the information from the MR sensor unit 20.

Namely, at the normal operation mode motor control signal (iu, iv, iw) generator 346, driving signals of U phase, V phase, W phase are generated (S 801), the number of pulses of the U phase, the V phase, and the W phase corresponding to the driving signal are acquired from the EEPROM 333 etc. (S 802), and further, data of a width of the Z phase signal and the Z phase signal (Z1, Z2, -, -, Zn) are acquired (S803, S804). The rising position of U phase is synchronized with the absolute origin position ($Z_O$) (S805). Next, acquire A/B phase signals from the MR sensor unit via RAM (S806), then based on incremental cumulative addition values of these signals, absolute each of those signals of the A/B phase signals, Z phase signal, signals of each phase of U, V, W per rotation by giving address of the EEPROM, and records those data in the RAM (S807).

From the Z phase signal and the A/B phase signals, the absolute signals of multi rotation including information of the rotating speed and angle of rotation of the brushless DC servo motor are generated (S808), and those data are recorded in the EEPROM via the RAM (S809).

That is, in accordance with the normal rotation and the reverse rotation of the rotary shaft of the brushless DC servo motor, each of the signals A, B, Z, U, V, W is incremented or decremented every time the rotator shaft of the motor rotates, and the information are sequentially recorded in the EEPROM via the RAM as information representing the current position of the rotary shaft of the brushless DC servo motor.

Figure 14:
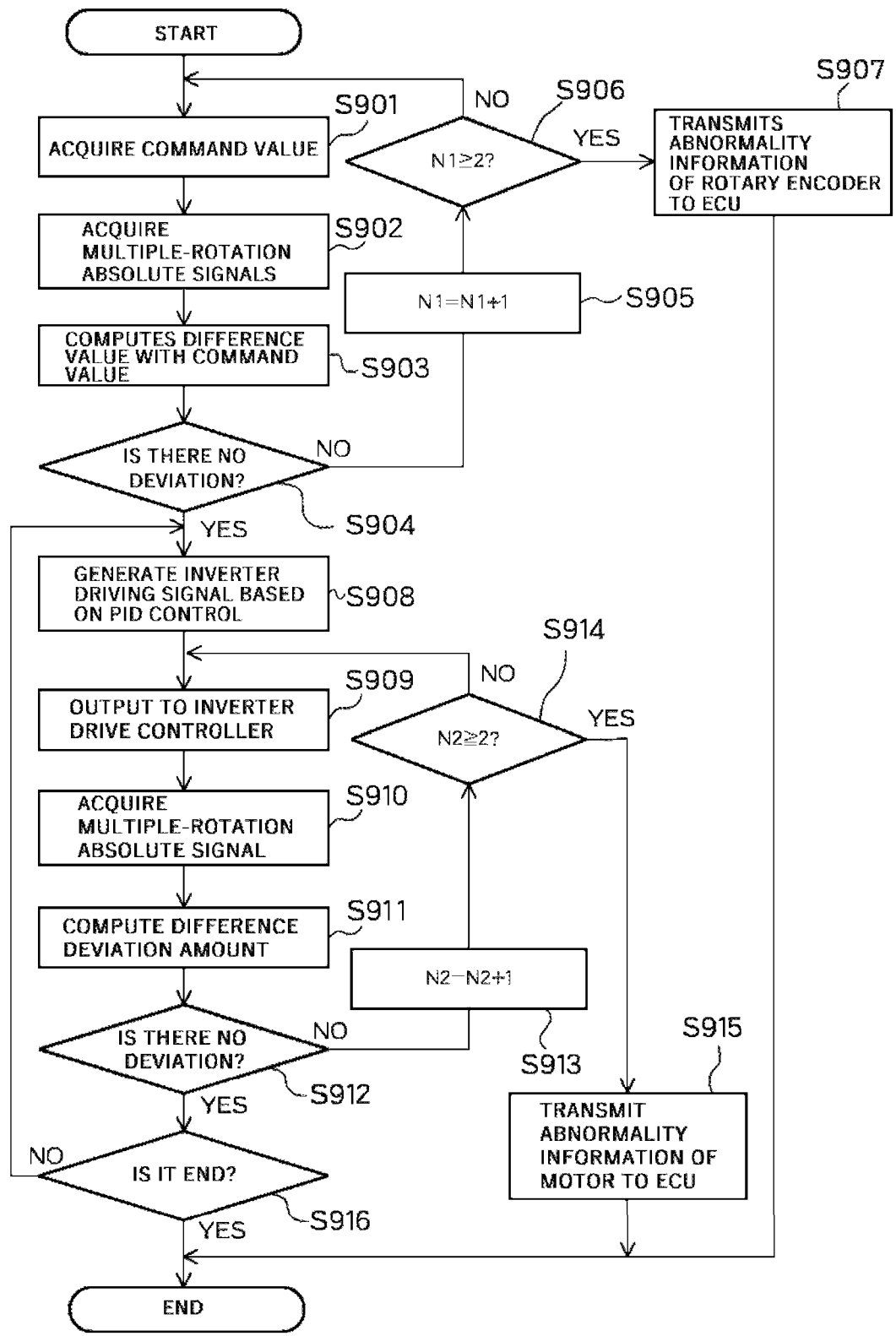
FIG. 14 is a flow chart showing the details of the operation of a DC servo control unit and an inverter driving signal generator at the time of the normal operation mode in the first embodiment.

Next, operation of the DC servo control unit 347 and the inverter driving signal generator 348 in the normal operation mode is described referring to FIG. 1 and FIG. 14.

In the normal operation mode, when the brushless DC servo motor 100 rotates, the control unit 300 of the brushless DC servo motor generates a sine-wave driving signal for driving the inverter for each of the coils of U phase, V phase, and W phase, by recognizing the rotation speed and rotation direction and the absolute origin position of the brushless DC servo motor based on the A/B phase signals from the MR sensor unit 20 and comparing the recognized rotation speed and rotation direction and absolute origin position with the command Value.

That is, according to angle of rotation of the rotor, the voltage of the coil of the stator is continuously changed to sine wave shape, and the rotor is rotated. The electric power of the sine voltage which shifted a 120° (electrical angle) phase is input into each coil of U phase, V phase, and W phase. As a signal to the inverter as as the drive circuit of the motor, the duty ratio of a PWM signal is controlled and voltage is changed continuously.

Usually, the DC servo control unit 347 in the normal operation mode, recognizes the current rotation angle of the rotary shaft 13 of the brushless DC servo motor 100, and hence the current absolute position of the driven component 15, based on the signal of the rotating speed, the angle of rotation, and absolute multi rotation signal which are recorded in the EEPROM in the form of a table shown FIG. 11B, etc. The DC servo control unit 347 calculates the speed commanding value from the current position of the driven component 15 to a target position, etc. based on the information. The inverter driving signal generator 348 generates the inverter driving signal for controlling rotation of brushless DC servo motor 100 in response to the output of the DC servo control unit 347, and outputs it to the inverter drive controller 41.

FIG. 14 is a flow chart which shows the details of operation of the DC servo control unit 347 and the inverter driving signal generator 348, in the normal operation mode.

In the normal operation mode, the DC servo control unit 347 acquires the position and target speed of each target based on the operating pattern of the brushless DC servo motor set up preliminarily, from the memories 330, such as RAM, as a command value (S901). In the memory, motor driving signals on the assumption of sine wave drive or PID control, for example, data of PWM control signals are stored. Those data are, for example, data as a target speed corresponding to the operation pattern of the brushless DC servo motor set corresponding to each target position of the driven component.

As an example of the operation pattern including the position of each target, the brushless DC servo motor is driven with an acceleration region from the inversion position of the driven component to the end position of acceleration, a constant speed region from the end position of acceleration to the start position of braking, and a deceleration region from the start position of braking to the reversal position. According to such a predetermined operating pattern, the PWM control of the brushless DC servo motor is carried out.

For example, the inverter driving signal generator 348 acquires signal of the absolute multi rotation (S902), then computes a difference value with a command value (8903). Based on the calculation result, the inverter driving signal generator 348 judges the presence or absence of "deviation" (S904), and if difference is over the acceptable value, it is determined that there is "deviation", and if the deviation is the second time (S905, S906), it is determined that the rotary encoder (the MR sensor unit 20) has an error including the deviation, and transmits abnormality information to the ECU 500 (S907), and ends the process. When the EEPROM itself instead of the rotary encoder has abnormalities, it can check at this time.

When there is "no deviation" by the judgment of the deviation (S904), the inverter driving signal based on PID control is generated (8908), and the driving signal is output to the inverter drive controller 41 (S909). Then, the multi rotation and the absolute signal based on A/B phase signals from the MR sensor unit 20 are acquired (S910), and the difference deviation amount of the inverter driving signal, and the absolute multi rotation signal is computed (S911).

Next, the existence of the deviation is judged (S912), if difference deviation amount exceeds an acceptable value continuously twice (S913, S914), it is judged that the brushless DC servo motor being unusual, and the abnormality information of the brushless DC servo motor is transmitted to ECU 500 (S915), and processing is ended.

By the judgment of difference deviation amount (S912), when there is "no deviation", a new inverter driving signal is generated (S908), hereafter, the same process is repeated, and operation is ended by the judgment (S916) of an end.

Thus, the brushless DC servo motor of this embodiment is a servo motor controlled using the output signal of one MR sensor 20 which functions as a rotary encoder.

Figure 15:
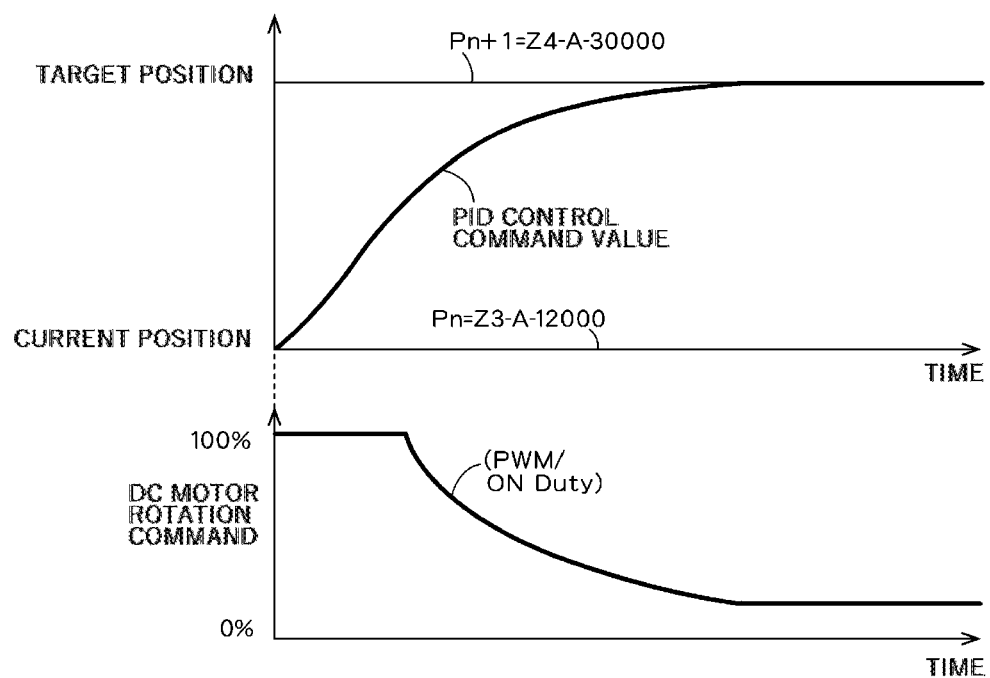
FIG. 15 is a diagram showing an example of control as a servo motor at the time of the normal operation mode in the first embodiment.

FIG. 15 shows an example of controlling a servo motor using the data of EEPROM based on the first embodiment. The brushless DC servo motor is precisely and quickly driven from the current position $P_n$ to the target position $P_{n+1}$, by the information of multiple rotation and the absolute signal of the EEPROM and the rotation command combined the PID control and the PWM control.

Thus, the control unit 300 of the brushless DC servo motor continues the drive of the brushless DC servo motor, recognizing the operating state of the driven component one by one based on A/B phase signals from the MR sensor unit 20, and the information on an apparatus encoder. Thereby, the driven component performs operation based on a predetermined operating pattern withy in a predetermined angle range.

According to an embodiment of the present invention, it is possible to provide a control device for a brushless DC servo motor which can control the position of a driven component with extremely high accuracy, by using one MR sensor as a rotary encoder, generating phase information of each phase coil of Z phase, U phase, V phase, W phase based on the A/B phase signals of the MR sensor unit, and servo-controlling the phase of the stator coil and the magnetic pole position of the rotor synchronously with the origin position in a completely closed loop.

Embodiment 2

Next, the second embodiment of the present invention is described.

In the second embodiment, in the same manner as the first embodiment, after determining the absolute origin position of the rotary shaft and formally fixing the magnet to the rotary shaft, the width of the Z phase is determined with respect to the signals relating to the U, V, W phase coils.

Namely, in the first embodiment, before fixing the magnet at the absolute origin position of the rotary shaft, the width of the Z phase is determined with respect to the signals relating to the U, V, W phase coils. Instead, in this embodiment, after fixing the magnet at the absolute origin position of the rotary shaft, the width of the Z phase is determined with respect to the signals relating to the U, V, W phase coils, and a table of absolute data is generated and recorded in the EEPROM. The effect acquired is the same as the first embodiment of the present invention.

Embodiment 3

Next, the third embodiment of the present invention is described. The third embodiment includes a driven device of an automobile driven by a brushless DC servo motor.

In this embodiment, each function of the control unit is different from the control unit 300 in FIG. 1 and is incorporated in an on-vehicle engine control ECU. The functions of the DC servo motor drive control unit 41 and the current controller 44 are also incorporated in the onboard ECU. Since functions of each of the control unit etc. of the third embodiment and the configurations of the brushless DC servo motor and its driving circuit are the same as those of the control unit 300 of FIG. 1 and the driving circuit of FIG. 3, a description thereof is omitted.

According to this embodiment, since the driven equipment of the automobile are driven based on the information on the absolute signal generated by one MR sensor unit as a rotary encoder, the driven equipment can be controlled with extremely high accuracy. It can realize easily by incorporating the easy program for a computer, and can provide a control device for a DC motor with low cost and versatility. Also in the case of an abnormal stop, since absolute multi rotation signal are recorded in the EEPROM, at the time of next starting, the existence of the abnormal stop of the driven equipment of the automobile can be judged, and safe operation can be started.

Embodiment 4

Next, the fourth embodiment of the present invention is described.

Figure 16:
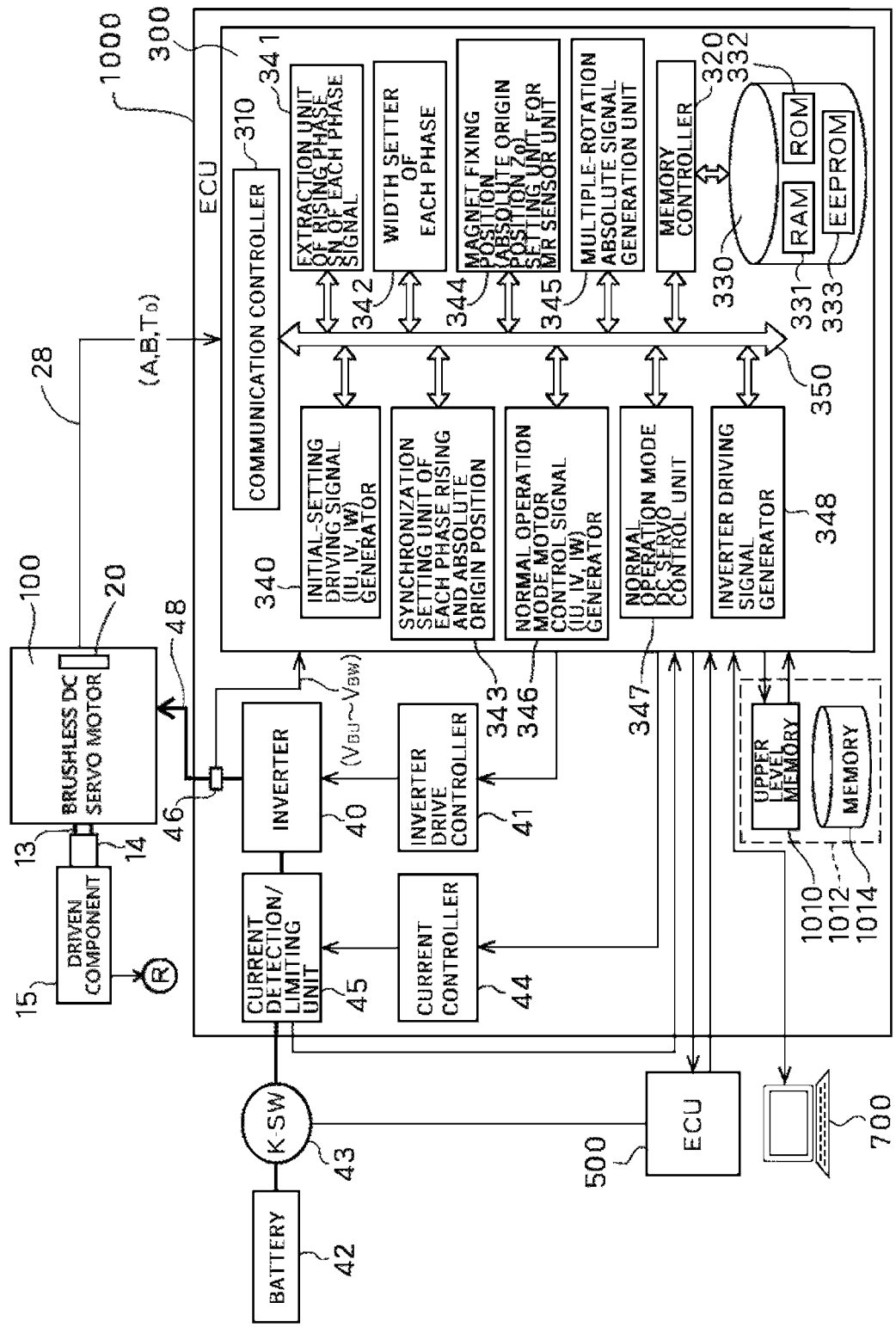
FIG. 16 is a functional block diagram of a control device for a brushless DC servo motor according to the fourth embodiment of the present invention.

FIG. 16 is a functional block diagram of the control device for a brushless DC servo motor based on the 4th embodiment of the present invention.

In this embodiment, each functions of the control unit 300 are incorporated in a ECU 1000 installed in an automobile, differ in the control unit 300 of FIG. 1. The function of the inverter drive controller 41 or the inverter 40 is also incorporated in a ECU 1000 installed in the automobile. The ECU 1000 is provided with a control unit 1012 containing an upper level processor 1010 to the control unit 300, and an upper level memory 1014. Since each function of the control unit 300, the inverter 40, the inverter drive controller 41, the current controller 44, the current detection/limiting unit 45, and the counter electromotive force detector 46 is the same as that of corresponding one of FIG. 1, a description thereof is omitted.

As the driven component, a plurality of on vehicle devices driven by a brushless DC servo motor can be targeted. For example, there are a water pump, a lubricating oil pump, etc. as a driven component. These driven components can be controlled in accurate multiple rotation position based on multiple rotation and absolute signals by the brushless DC servo motor 100, and even when restarting after an abnormal stop, it can be quickly returned to a normal state.

Various kinds of information related to the control of the automobile and the engine are inputted to the ECU 1000 in the 4th embodiment (not shown).

In the brushless DC servo motor which drives each driven component, one MR sensor unit 20 is provided respectively, and A/B phase signals generated in each of the MR sensor unit 20 are transmitted to the ECU 1000 via the communication cable 28 as a serial signal with which it corresponds to the standard of ISO26262. Since the information necessary for driving each driven component often includes information common to other driven components, it is desirable to collectively manage the information by the ECU 1000.

According to this embodiment, based on the information on the absolute signal generated based on the output of each of the MR sensor unit, each driven component is driven by a brushless DC servo motor. Therefore, the position of each driven component can be controlled with very sufficient accuracy. Also in the case of an abnormal stop, since the absolute signal is recorded in the EEPROM, at the time of next starting, it can be judged the existence of the abnormal stop of each driven component of the automobile, and can realize a safe start up.

Embodiment 5

Next, the fifth embodiment of the present invention is described. In this embodiment, two functions are added to each of the above embodiments. Namely, a function of determining whether or not the motor has been intentionally moved after electric power is no longer supplied from the battery, by acquiring data from the EEPROM at the time of activation of the automobile, and comparing the addresses of the acquired data, and a function of returning the motor, when it is judged that the motor has been intentionally moved, to the state at the moment when power is no longer supplied from the battery, based on the address of the acquired data.

Thereby, even when a motor drives intentionally after disappearance of a battery power source, a safe operation start can be realized at the next startup.

Embodiment 6

Next, the sixth embodiment of the present invention is described.

A control device for a brushless DC servo motor according to the present invention is, not only a brushless DC servo motor mounted on an automobile, but also applicable to a brushless DC servo motor in other fields that drives a driven component that requires multiple-rotation absolute signals based on information on the absolute origin position.

For example, by adopting the brushless DC servo motor of the present invention for an actuator etc. of a hand of a robot or the like, the position of the actuator can be controlled with extremely high accuracy by the absolute signal.

What is claimed is:

1. A control device for a brushless DC servo motor, comprising:
    a control unit for generating and outputting a driving signal and controlling electric power supplied to each of three phase stator coils of U phase, V phase, W phase of the brushless DC servo motor; and
    a MR sensor unit for detecting rotation of a rotor having a multi-pole permanent magnet,
    wherein the MR sensor unit comprises:
    a flat plate magnet fixed to one end of a rotary shaft of the rotor and having a pair of N pole region and S pole region magnetized in a radial direction;
    a pair of MR sensors fixed to a housing side at a position facing the flat plate magnet; and
    a processing circuit unit,
    wherein the processing circuit unit sets a position on a boundary line between the N pole region and the S pole region of the flat plate magnet as a magnet origin position, generates signals of phase A and phase B in accordance with rotation of the rotary shaft based on outputs of the pair of MR sensors, and outputs information on the magnet origin position,
    wherein the control unit comprises:
    a unit for generating each phase information of the U phase, the V phase, the W phase each of which synchronized with a rising phase of an output signal of the A phase or the B phase of the MR sensor unit according to a number of multi-poles of the rotor,
    a unit for obtaining an absolute origin position of the rotary shaft with respect to the driving signal based on a synchronization relationship of: a driving signal rising phase at which one of the three phase stator coils rises from zero; an integrated value peak phase of counter electromotive force to the one of the three phase stator coils obtained by driving the motor; and a rising phase of the output signals of the A phase or the B phase from the MR sensor unit corresponding to zero of the driving signal, and a unit for setting a plurality of Z phase signals at 360 degree intervals synchronized with the rising of the A phase or B phase output signal corresponding to zero of the driving signal, wherein the flat plate magnet is fixed on the rotary shaft at a position where the magnet origin position is synchronized with the absolute origin position of the rotary shaft with respect to the driving signal, and wherein the control device is configured to drive the motor using the MR sensor unit as a rotary encoder of the U-phase, V-phase, and W-phase.

2. The control device for the brushless DC servo motor according to claim 1, wherein the control unit further comprises:

a unit for generating a plurality of width of Z phase signals in synchronization with the rising position of the first A phase signal or the falling of the A phase signal of each of the Z phase signals and each signal having a width corresponding to one to several pulses of the A phase signal;

a unit for generating data of provisional multiple-rotation absolute signal by giving addresses of an EEPROM to information of each of phase signals of A phase, B phase, Z phase, the width of Z phase, and phases of the U, V, and W with reference to the magnet origin position, and generates as data of provisional multiple-rotation absolute signal, and a unit for converting the data of the provisional multiple-rotation absolute signal into data of multiple-rotation absolute signal with reference to the absolute origin position of the rotary shaft and recording the data in the EEPROM, wherein the control unit is configured to drive the motor using the data of the EEPROM.

3. The control device for the brushless DC servo motor according to claim 2, wherein the control unit is configured to generate the data of multiple-rotation absolute signal by adding the address of the EEPROM to the combination of the data of the cumulative addition values for each of output A/B phase signals accompanying every rotation of the rotary shaft and the information of the magnet origin position.

4. The control device for the brushless DC servo motor according to claim 1, wherein the control unit is constituted as an ASIC and fixed to the brushless DC servo motor.

5. The control device for the brushless DC servo motor according to claim 2, wherein the brushless DC servo motor is a servo motor which drives a driven component of an automobile, wherein the control device comprising a battery as a power supply of the EEPROM, and a backup battery that functions as a power supply of the MR sensor unit, the control unit, and the EEPROM when electric power is no longer supplied from the battery, wherein the control unit is fixed to an ECU or the driven component of the automobile, wherein the control unit comprises:

a unit for acquiring signals of widths of the A phase, the B phase, the Z phase signal, the Z phase, and data of each phase of the U phase, the V phase, and the W phase from the EEPROM, and determining whether the brushless DC servo motor has been intentionally moved after electric power is not supplied from the battery, and a unit for restoring the motor to the state at the point in time when power is no longer supplied from the battery, when it is determined that the motor has been intentionally moved.

6. A brushless DC servo motor, comprising:

a stator which has three phase stator coils of U phase, V phase, and W phase, and is held in a housing;

a rotor which has a multi-poles permanent magnet and is fixed to a rotary shaft, a control unit which controls electric power which generates and outputs a driving signal and is supplied to each of the stator coils;

a control unit which controls electric power supplied to each of three phase stator coils of the U phase, the V phase, and the W phase; and a MR sensor unit which detects rotation of the rotor, wherein the MR sensor unit comprises:

a plate-like magnet which has a pair of N pole region and S pole region magnetized in a radial direction and is fixed to an end of the rotary shaft of the rotor;

a pair of MR sensors fixed to the housing side in a position which opposes to the plate-like magnet; and a processing circuit unit, wherein the processing circuit unit sets a position on a boundary line between the N pole region and the S pole region of the plate-like magnet as a magnet origin position, generates signals of phase A and phase B in accordance with rotation of the rotary shaft based on outputs of the pair of MR sensors, and outputs information on the magnet origin position, wherein the control unit comprises:

a unit for generating each phase information of the U phase, the V phase, the W phase each of which synchronized with a rising phase of the output signal of the A phase or the B phase of the MR sensor unit according to a number of poles of the rotor, a unit for obtaining an absolute origin position of the rotary shaft with respect to the driving signal based on a synchronization relationship of a driving signal rising phase at which one of the three phase stator coils rises from zero, an integrated value peak phase of counter electromotive force to one of the three phase stator coils obtained by driving the motor, and a rising phase of the output signal of the A phase or the B phase from the MR sensor unit corresponding to zero of the driving signal, and a unit for setting a plurality of Z phase signals at 360 degree intervals synchronized with the rising of the A phase or B phase output signal corresponding to zero of the driving signal, wherein the plate-like magnet is fixed at a position where the origin position is synchronized with the absolute origin position of the rotary shaft with respect to the driving signal, and wherein the control device is configured to drive the motor using the MR sensor unit as a rotary encoder of the U-phase, the V-phase, and the W-phase.

7. The brushless DC servo motor according to claim 6, wherein the control unit is constituted as a ASIC and fixed in a housing of the brushless DC servo motor, wherein the control unit further comprises:

a unit for generating a plurality of signals of width of Z phase signals in synchronization with the rising position of the first A phase signal or the falling of the A phase signal of each of the Z phase signals and each signal having a width corresponding to one to several pulses of the A phase signal;

a unit for generating data of provisional multiple-rotation absolute signal by giving addresses of an EEPROM to information of each of phase signals of A phase, B phase, Z phase, the width of Z phase, and phases of the U, V, and W with reference to the magnet origin position, and generates as data of provisional multiple-rotation absolute signal; and a unit for converting the data of the provisional multiple-rotation absolute signal into data of multiple-rotation absolute signal with reference to the absolute origin position of the rotary shaft and recording the data in the EEPROM, wherein the control unit is configured to drive the motor using the data of the EEPROM.

8. A control unit of a brushless DC servo motor generating and outputting a drive signal, wherein the brushless DC servo motor comprises a multi-poles rotor fixed to a rotary shaft, and a stator with three-phase stator coils, wherein power is supplied to three-phase stator coils, and the control unit of the brushless DC servo motor receives a signal associated with rotation of the rotary shaft of the motor from a MR sensor unit having a pair of MR sensors, wherein the control unit comprises:

a unit for generating each phase information of a U phase, a V phase, a W phase each of which synchronized with a rising phase of an output signal of an A phase or a B phase of the MR sensor unit according to a number of poles of the rotor, a unit for obtaining an absolute origin position of the rotary shaft with respect to the driving signal based on a synchronization relationship of a driving signal rising phase at which one of the three phase stator coils rises from zero, an integrated value peak phase of counter electromotive force to one of the three phase stator coils obtained by driving the motor, and a rising phase of the output signal of the A phase or the B phase from the MR sensor unit corresponding to zero of the driving signal; and a unit for setting a plurality of Z phase signals at 360 degree intervals synchronized with a rising position of the A phase or the B phase output signal corresponding to zero of the driving signal, wherein a flat plate magnet is fixed on the rotary shaft at a position where a magnet origin position is synchronized with the absolute origin position of the rotary shaft with respect to the driving signal, and wherein the control unit is configured to drive the motor using the MR sensor unit as a rotary encoder of the U-phase, the V-phase, and the W-phase.

9. The control unit according to claim 8, wherein the control unit further comprises:

a unit for generating a plurality of signals of width of Z phase signals in synchronization with the rising position of the first A phase signal or the falling of the A phase signal of each of the Z phase signals and each signal having a width corresponding to one to several pulses of the A phase signal;

a unit for generating data of provisional multiple-rotation absolute signal by giving addresses of an EEPROM to information of each of phase signals of the A phase, the B phase, the Z phase, the width of Z phase, and phases of the U, V, and W with reference to the magnet origin position, and generates as data of provisional multiple-rotation absolute signal, and a unit for converting the data of the provisional multiple-rotation absolute signal into data of multiple-rotation absolute signal with reference to the absolute origin position of the rotary shaft and recording the data in the EEPROM, and wherein the control unit is configured to drive the motor using the data of the EEPROM.

10. A manufacturing method of a brushless DC servo motor, wherein the brushless DC servo motor comprises: a control unit for generating and outputting a driving signal and controlling electric power supplied to each of three phase stator coils of U phase, V phase, W phase of the brushless DC servo motor; and a MR sensor unit for detecting rotation of a rotor having a multi-pole permanent magnet, wherein the MR sensor unit comprises:

a flat plate magnet fixed to one end of a rotary shaft of the rotor and having a pair of N pole region and S pole region magnetized in a radial direction;

a pair of MR sensors fixed to a housing at a position facing the flat plate magnet; and a processing circuit unit, wherein a position on a boundary line between the N pole region and the S pole region of the flat plate magnet is set as a magnet origin position, the method comprising step of:

by the MR sensor unit, generating and outputting signals of phase A and phase B in accordance with rotation of the rotary shaft based on outputs of the pair of MR sensors, and outputs information on the magnet origin position, by the control unit, generating each phase information of the U phase, the V phase, the W phase each of which synchronized with a rising phase of the output signal of the A phase or the B phase of the MR sensor unit according to the number of poles of the rotor, obtaining an absolute origin position of the rotary shaft with respect to the driving signal based on a synchronization relationship of a driving signal rising phase at which one of the three phase stator coils rises from zero, an integrated value peak phase of counter electromotive force to the one-phase stator coil obtained by driving the motor, and a rising phase of the output signal of the A phase or the B phase from the MR sensor unit corresponding to zero of the driving signal, setting a plurality of Z phase signals at 360 degree intervals synchronized with a rising position of the A phase or B phase output signal corresponding to zero of the driving signal, generating data of provisional multiple-rotation absolute signal by giving addresses of an EEPROM to information of each of phase signals of the A phase, the B phase and the Z phase, width of Z phase, and phases of U, V, and W with reference to the magnet origin position, and recording the data of provisional multiple-rotation absolute signal in the EEPROM, converting the data of the provisional multi-rotational absolute signal into the data of multi-rotation/absolute signal based on the absolute origin position of the rotary shaft and recording the data of multi-rotation/absolute signal in the EEPROM, and fixing the flat plate magnet on the rotary shaft at a position where the magnet origin position is synchronized with the absolute origin position of the rotary shaft.

* * * * *